US012222916B2

United States Patent
Dong et al.

(10) Patent No.: US 12,222,916 B2
(45) Date of Patent: Feb. 11, 2025

(54) COUPLING TABLE SPECIFICATION SYSTEM, COUPLING TABLE SEARCH DEVICE, METHOD, AND PROGRAM

(71) Applicant: NEC Corporation, Tokyo (JP)

(72) Inventors: Yuyang Dong, Tokyo (JP); Masafumi Oyamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/024,163

(22) PCT Filed: Sep. 2, 2020

(86) PCT No.: PCT/JP2020/033308
§ 371 (c)(1),
(2) Date: Mar. 1, 2023

(87) PCT Pub. No.: WO2022/049680
PCT Pub. Date: Mar. 10, 2022

(65) Prior Publication Data
US 2023/0394016 A1    Dec. 7, 2023

(51) Int. Cl.
G06F 16/22      (2019.01)
G06F 16/2453   (2019.01)
G06F 16/2455   (2019.01)

(52) U.S. Cl.
CPC ...... *G06F 16/221* (2019.01); *G06F 16/24542* (2019.01); *G06F 16/2455* (2019.01)

(58) Field of Classification Search
CPC ............. G06F 16/221; G06F 16/24542; G06F 16/2455
See application file for complete search history.

(56) References Cited

U.S. PATENT DOCUMENTS 9,342,553 B1*    5/2016 Fuller .................. G06F 16/245
2006/0259457 A1* 11/2006 Muras ............... G06F 16/24524
(Continued)

FOREIGN PATENT DOCUMENTS

JP    2001-155028 A    6/2001
JP    2010-176327 A    8/2010
(Continued)

OTHER PUBLICATIONS

International Search Report for PCT Application No. PCT/JP2020/033308, mailed on Nov. 17, 2020.
(Continued)

*Primary Examiner* — Robert W Beausoliel, Jr.
*Assistant Examiner* — Mohammad S Bhuyan

(57) ABSTRACT

A coupling table search device 530 includes: input means 531 that receives an input of a coupling index from a coupling index storage unit 520; search plan generation means 532 that calculates, for each coupling index, the number of results that is the number of couplable record pairs estimated in a case where a record in a target column is found using the coupling index for each similarity function, and generates a search plan that defines a use order of the coupling index in descending order of the calculated number of results; and record search means 533 that searches for a record in the target column by using the coupling index in the order defined in the search plan, and specifies the external table in which records whose number is equal to or larger than a predetermined threshold have been found as a coupling table.

6 Claims, 19 Drawing Sheets

(56) References Cited

U.S. PATENT DOCUMENTS

| | | |
|---|---|---|
| 2010/0191682 A1 | 7/2010 | Takamatsu |
| 2016/0154851 A1* | 6/2016 | Sugaya ............... G06F 16/2455 707/741 |
| 2018/0004722 A1* | 1/2018 | Naor ....................... G06F 16/93 |
| 2018/0157706 A1 | 6/2018 | He et al. |
| 2018/0240019 A1 | 8/2018 | Sato et al. |
| 2019/0317938 A1 | 10/2019 | Agarwalla et al. |
| 2022/0171754 A1* | 6/2022 | Long .................. G06F 16/2272 |

FOREIGN PATENT DOCUMENTS

| | | |
|---|---|---|
| JP | 2017-188137 A | 10/2017 |
| WO | 2018/025706 A1 | 2/2018 |

OTHER PUBLICATIONS

J.Wang, et al., "Entity Matching:How Similar Is Similar", Proceedings of the VLDB Endowment, pp. 622-633, Jul. 2011.

* cited by examiner

| COMPANY | PRODUCT NAME | STORE | SALES |
|---|---|---|---|
| | RAMUNE | | |
| | CHAMP ORANGE | | |
| | MY COLA | | |

FT1

| DRINK NAME | ATTRIBUTE 1 | ATTRIBUTE 2 |
|---|---|---|
| RAMUNE 250 ml | | |
| CHAMP Orange | | |
| COFFEE MILK | | |

FIG. 3

| COLUMN 1 | COLUMN 2 | COLUMN 3 |
|---|---|---|
| OYAMADA | 32 | M4 |
| DONG | 29 | A2 |

| COMPANY | PRODUCT NAME | STORE | SALES |
|---|---|---|---|
| | RAMUNE | | 1 |
| | CHAMP ORANGE | | 3 |
| | MY COLA | | 5 |

FT3

| DRINK NAME | ATTRIBUTE 1 | ATTRIBUTE 2 |
|---|---|---|
| RAMUNE 250 ml | 2 | 9 |
| CHAMP Orange | 1 | 7 |
| COFFEE MILK | 5 | 4 |

COUPLING TABLE SPECIFICATION SYSTEM, COUPLING TABLE SEARCH DEVICE, METHOD, AND PROGRAM

This application is a National Stage Entry of PCT/JP2020/033308 filed on Sep. 2, 2020, the contents of all of which are incorporated herein by reference, in their entirety.

TECHNICAL FIELD

The present invention relates to a coupling table specification system that specifies a table that is couplable to a target column, a coupling table specification method, a coupling table search device, a coupling table search method, and a coupling table search program.

BACKGROUND ART

In recent years, data analysis using not only data possessed by oneself but also external data, open data, a data lake, and the like (hereinafter, referred to as an external table group) has been performed. For example, in a case of predicting sales of a product of a certain store, not only information of the store but also data that can be a factor, such as weather conditions, a movement history of a customer, and a trend regarding a product of another company, are integrated, whereby prediction accuracy can be improved. Therefore, various methods for finding a table that is couplable to base information have been proposed.

For example, PTL 1 describes a method of coupling two tables. In the method described in PTL 1, a couplable row pair between two tables is determined, and a conversion model is generated from the determined couplable row pair. Then, a column of the first table is converted based on the generated conversion model, and the converted first table is coupled to the second table.

In addition, NPL 1 describes entity matching for finding a record that refers to the same entity. In the method described in NPL 1, an optimal similarity function is selected from among a plurality of similarity functions based on a similarity function for quantifying a similarity of a record and an observation result indicating that there is redundancy in a threshold.

Note that PTL 2 describes a table-meaning estimation system that estimates a meaning of a table.

CITATION LIST

Patent Literature

PTL 1: US Patent Application Publication No. 2018/0157706
PTL 2: International Publication No. WO2018/025706

Non Patent Literature

NPL 1: J. Wang, et al., "Entity Matching: How Similar Is Similar", Proceedings of the VLDB Endowment, pp. 622-633, July 2011.

SUMMARY OF INVENTION

Technical Problem

Meanwhile, each table of the external table group does not necessarily have a unified notation rule or schema. For example, a case where a certain beverage is managed in a column "product name" in a table held by a certain store, and is managed in a column "drink name" in a table held by a certain analysis company may be considered. In addition, as for a beverage name, it is considered that there is a record that holds the beverage name alone and there is a record that holds the beverage name including the volume.

In the method described in NPL 1, a similarity between records to be coupled is calculated using the similarity function. Then, in a case where a value calculated by a certain similarity function is larger than a threshold $T_r$, it is determined that the two records can be coupled. Further, in the method described in NPL 1, in a case where the number of record pairs determined to be couplable in two columns to be coupled is equal to or larger than a threshold $T_c$, it is determined that the two columns can be coupled.

Here, a case of searching for a couplable table from the external table group for a table as a coupling source (which may hereinafter be referred to as a base table) is considered. In a simple method using the similarity function described above, similarities of all records in columns of all the tables included in the external table group are calculated by the similarity function for each record of each column of the base table. When the number of all records included in the external table group is N and the number of all records in the base table is M, the calculation amount is 0 (NM). Furthermore, in a case of calculating the similarities by using a plurality of similarity functions, when the number of similarity functions is F, the calculation amount is 0 (NMF).

For example, in a case where the method described in NPL 1 is simply used, the number N of records of the external table group is huge, and thus there is a problem that the calculation amount for specifying a couplable table becomes enormous.

In this regard, an exemplary object of the present invention is to provide a coupling table specification system, a coupling table specification method, a coupling table search device, a coupling table search method, and a coupling table search program that can reduce a cost for specifying a table that is couplable to a target column.

Solution to Problem

A coupling table specification system according to the present invention includes: a coupling index construction device that constructs a coupling index that is an index for searching for a record of an external table of which a similarity calculated by a similarity function that is a function for calculating a similarity between records is greater than a predetermined threshold; a coupling index storage unit that stores the coupling index for each similarity function; and a coupling table search device that searches for a table that is couplable to a target column among the external tables by using the coupling index, in which the coupling index construction device includes coupling index generation means that generates the coupling index for each similarity function and stores the generated coupling index in the coupling index storage unit, the coupling table search device includes: input means that receives an input of the coupling index from the coupling index storage unit; search plan generation means that calculates, for each coupling index, the number of results that is the number of couplable record pairs estimated in a case where a record in the target column is found by using the coupling index for each similarity function, and generates a search plan that defines a use order of the coupling index in descending order of the calculated number of results; and record search means that searches for the record in the target column by using the coupling index in the order defined in the search plan, and specifies the external table in which records whose number is equal to or larger than a predetermined threshold have been found as a coupling table, and the record search means excludes, from a search target, a record in the external table found using an already used coupling index, and performs a search using a subsequent coupling index.

A coupling table search device according to the present invention includes: input means that receives, from a storage device that stores, for each similarity function, a coupling index that is an index for searching for a record of an external table of which a similarity calculated by a similarity function that is a function for calculating a similarity between records is greater than a predetermined threshold, an input of the coupling index; search plan generation means that calculates, for each coupling index, the number of results that is the number of couplable record pairs estimated in a case where a record in the target column is found by using the coupling index for each similarity function, and generates a search plan that defines a use order of the coupling index in descending order of the calculated number of results; and record search means that searches for the record in the target column by using the coupling index in the order defined in the search plan, and specifies the external table in which records whose number is equal to or larger than a predetermined threshold have been found as a coupling table, in which the record search means excludes, from a search target, a record in the external table found using an already used coupling index, and performs a search using a subsequent coupling index.

A coupling table specification method according to the present invention includes: generating a coupling index that is an index for searching for a record of an external table of which a similarity calculated by a similarity function that is a function for calculating a similarity between records is greater than a predetermined threshold, for each similarity function; storing the generated coupling index in a coupling index storage unit; receiving an input of the coupling index from the coupling index storage unit; calculating, for each coupling index, the number of results that is the number of couplable record pairs estimated in a case where a record in the target column is found by using the coupling index for each similarity function; generating a search plan that defines a use order of the coupling index in descending order of the calculated number of results; and searching for the record in the target column by using the coupling index in the order defined in the search plan, and specifying the external table in which records whose number is equal to or larger than a predetermined threshold have been found as a coupling table, in which in the searching for the record, a record in the external table found using an already used coupling index is excluded from a search target, and a search using a subsequent coupling index is performed.

A coupling table search method according to the present invention includes: receiving, from a storage device that stores, for each similarity function, a coupling index that is an index for searching for a record of an external table of which a similarity calculated by a similarity function that is a function for calculating a similarity between records is greater than a predetermined threshold, an input of the coupling index; calculating, for each coupling index, the number of results that is the number of couplable record pairs estimated in a case where a record in the target column is found by using the coupling index for each similarity function; generating a search plan that defines a use order of the coupling index in descending order of the calculated number of results; and searching for the record in the target column by using the coupling index in the order defined in the search plan, and specifying the external table in which records whose number is equal to or larger than a predetermined threshold have been found as a coupling table, in which in the searching for the record, a record in the external table found using an already used coupling index is excluded from a search target, and a search using a subsequent coupling index is performed.

A coupling table search program according to the present invention causes a computer to execute: input processing of receiving, from a storage device that stores, for each similarity function, a coupling index that is an index for searching for a record of an external table of which a similarity calculated by a similarity function that is a function for calculating a similarity between records is greater than a predetermined threshold, an input of the coupling index; search plan generation processing of calculating, for each coupling index, the number of results that is the number of couplable record pairs estimated in a case where a record in the target column is found by using the coupling index for each similarity function, and generating a search plan that defines a use order of the coupling index in descending order of the calculated number of results; and record search processing of searching for the record in the target column by using the coupling index in the order defined in the search plan, and specifying the external table in which records whose number is equal to or larger than a predetermined threshold have been found as a coupling table, in which in the record search processing, a record in the external table found using an already used coupling index is excluded from a search target, and a search using a subsequent coupling index is performed.

Advantageous Effects of Invention

According to the present invention, it is possible to reduce a cost for specifying a table that is couplable to a target column.

BRIEF DESCRIPTION OF DRAWINGS

FIG. 2 It depicts an explanatory diagram illustrating an example of processing of determining a couplable table.

FIG. 3 It depicts an explanatory diagram illustrating an example of processing of estimating a column type.

FIG. 9 It depicts an explanatory diagram illustrating an example of processing of determining whether or not to exclude a feature vector.

DESCRIPTION OF EMBODIMENTS

Hereinafter, exemplary embodiments of the present invention will be described with reference to the drawings.

First Exemplary Embodiment

Figure 1:
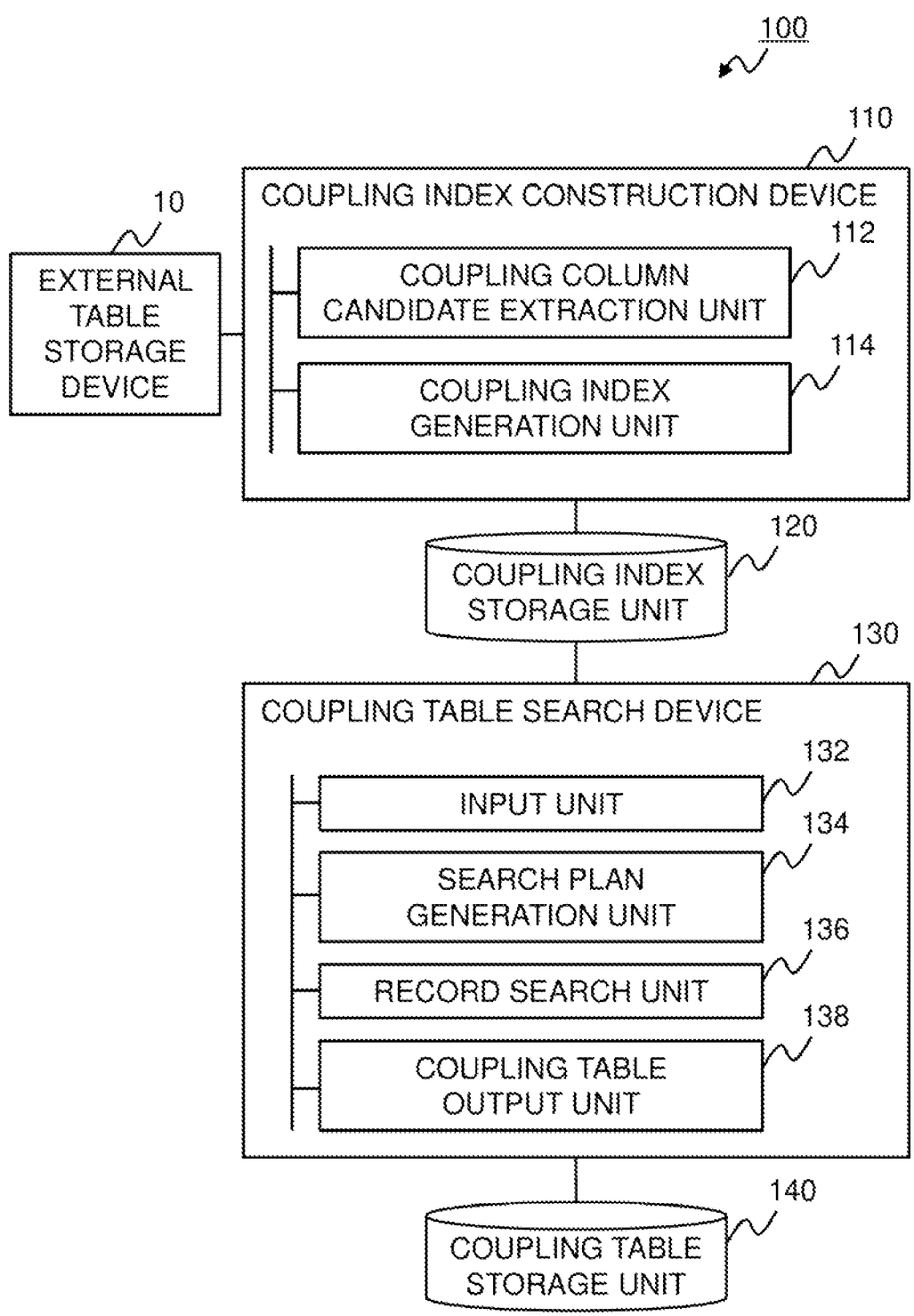
FIG. 1 It depicts a block diagram illustrating a configuration example of an exemplary embodiment of a coupling table specification system according to the present invention.

First, a first exemplary embodiment of the present invention will be described. The first exemplary embodiment aims to reduce a cost for specifying a table that is couplable to a target column. FIG. 1 is a block diagram illustrating a configuration example of an exemplary embodiment of a coupling table specification system according to the present invention. A coupling table specification system 100 of the present exemplary embodiment is a system that specifies an external table (hereinafter, referred to as a coupling table) that is couplable to a table as a coupling source (that is, a base table). More specifically, the coupling table is a table including a column that is couplable to any column included in the base table.

In addition, the coupling table specification system 100 of the present exemplary embodiment determines whether or not a record is couplable by using a function that calculates a similarity between records (hereinafter, referred to as a similarity function). Examples of the similarity function include Jaccard similarity, an edit distance, a Euclidean distance of a character string converted based on Word2vec, and the like. Note that the similarity function used in the present exemplary embodiment is not limited to these three types of similarity functions.

Since the similarity functions as exemplified above have different viewpoints, an optimal similarity function cannot be uniquely determined. For example, a similarity between "RAMUNE" and "RAMUNE 250 ml" is calculated as 0.375 in a case of the edit distance, and is calculated as 0.5 in a case of the Jaccard similarity. Meanwhile, a similarity between "champ orange" and "champ orange" is calculated as 0.875 in a case of the edit distance, and is calculated as 0.5 in a case of the Jaccard similarity. In this way, the value of the similarity is changed according to contents of records to be compared.

For example, in the method described in NPL 1, two records are defined to be couplable in a case where the greatest similarity is greater than a threshold $T_r$ among similarities calculated by respective similarity functions. FIG. 2 is an explanatory diagram illustrating an example of processing of determining a couplable table. FIG. 2 illustrates an example of determining whether or not an external table FT1 is couplable to a base table BT1. Here, it is assumed that the threshold $T_r$ of the similarity used to determine whether or not records are couplable is 0.5 ($T_r$=0.5), and a threshold $T_c$ of a record pair used to determine whether or not columns are couplable is 2 ($T_c$=2).

For example, it is assumed that the Jaccard similarity is calculated as 0.5, the edit distance is calculated as 0.37, and the similarity after Word2vec conversion is calculated as 0.8 for "RAMUNE" and "RAMUNE 250 ml" illustrated in FIG. 2. In this case, the greatest similarity is calculated as 0.8, which is greater than the threshold $T_r$, and thus it is determined that the two records are couplable.

Furthermore, in the example illustrated in FIG. 2, it is determined whether or not two columns of "product name" and "drink name" are couplable. Here, it is assumed that it is determined that "RAMUNE" and "RAMUNE 250 ml", and "champ orange" and "CHAMP Orange" are couplable, and it is determined that "my cola" is not couplable to any record. In this case, the number of couplable record pairs is two, and it is thus determined that two columns are couplable since the number is equal to or larger than the threshold $T_r$.

However, in a case where such determination processing is simply performed for all records, a calculation amount of O (NMF) is required as described above. Therefore, in the present exemplary embodiment, the calculation amount (cost) at the time of searching is reduced by constructing an index of an external table group in advance.

The coupling table specification system 100 illustrated in FIG. 1 includes an external table storage device 10, a coupling index construction device 110, a coupling index storage unit 120, a coupling table search device 130, and a coupling table storage unit 140.

The external table storage device 10 stores a plurality of external tables (that is, the external table group) as candidates to be coupled to a base table. An example of the external table is the external table FT1 illustrated in FIG. 2. The external table storage device 10 is implemented by, for example, a storage server, a magnetic disk, or the like.

In the present exemplary embodiment, a case where the coupling table specification system 100 includes the external table storage device 10 will be described. However, the coupling index construction device 110 may acquire the external table group from a storage (not illustrated) or the like connected through a communication line. In this case, the coupling table specification system 100 does not have to include the external table storage device 10.

The coupling index construction device 110 is a device that constructs an index (hereinafter, referred to as a coupling index) of an external table group used for coupling to a base table. The coupling index construction device 110 includes a coupling column candidate extraction unit 112 and a coupling index generation unit 114.

The coupling column candidate extraction unit 112 extracts, as a coupling column candidate, a column including a record that can be a key of coupling to another table among external tables included in the external table group. For example, the coupling column candidate extraction unit 112 estimates all column types of the external table group, and determines whether or not a column of the estimated type is couplable to a column of another table. Note that the column type here may be a type such as a "character string type" or a "numerical value type" indicating an attribute of a character, or may indicate a concept represented by the column.

A method of estimating the column type is arbitrary, and a known method may be used. The coupling column candidate extraction unit 112 may estimate each column type (meaning of the column) by using, for example, the method described in PTL 2. Then, for example, in a case where the estimated column type indicates a predetermined meaning or is an attribute of a predetermined character (for example, the character string type), the coupling column candidate extraction unit 112 may extract the column as the coupling column candidate.

FIG. 3 is an explanatory diagram illustrating an example of processing of estimating the column type. For example, based on records illustrated in FIG. 3, it is assumed that a column 1 including a character string is a column meaning "name", a column 2 including a number is a column meaning "age", and a column 3 including alphanumeric characters is a column meaning "grade".

In this case, the coupling column candidate extraction unit 112 may determine that there is a high possibility that data of the column meaning "name" will be a coupling key, and extract the column 1 as the coupling column candidate. In addition, for example, a numerical value type column or a column having a small number of unique values is unlikely to serve as the coupling key, and there is a high possibility that a character string type column serves as the coupling key. Therefore, the coupling column candidate extraction unit 112 may extract the character string type column 1 having a large number of unique values as the coupling column candidate.

The coupling index generation unit 114 generates a coupling index of an external table group. Specifically, the coupling index generation unit 114 generates a coupling index of the extracted coupling column candidates. In this way, a target of the index is limited to the coupling column candidate, so that a cost required to generate a coupling index and the size of a coupling index to be generated can be reduced.

In the present exemplary embodiment, the coupling index generation unit 114 creates, as the coupling index, an index for searching for a record whose similarity calculated by the similarity function is greater than a predetermined threshold for each similarity function. It is sufficient if the coupling index generation unit 114 generates the coupling index by any method according to the similarity function.

Various methods of generating the index according to the similarity function are known. For example, minHash-locality-sensitive hashing (LSH) is known as the index according to the similarity function for calculating the Jaccard similarity. Furthermore, a method of generating a set (matrix) of vectors on a memory and a library (FAISS) are known as the index according to the similarity function for calculating the Euclidean similarity. In addition, a transposed index is known as the index according to the similarity function for calculating whether or not there is an exact match. Since the method of generating these indexes is widely known, a detailed description thereof is omitted here.

As the coupling index generated in this way is used for searching, the calculation amount can be theoretically reduced to O (MF log(N)), and searching can be quickly performed. The coupling index generation unit 114 stores the generated coupling index in the coupling index storage unit 120.

The coupling column candidate extraction unit 112 and the coupling index generation unit 114 are implemented by a processor (for example, a central processing unit (CPU) or a graphics processing unit (GPU)) of a computer that operates according to a program (coupling index generation program).

For example, the program may be stored in a storage unit (not illustrated) included in the coupling index construction device 110, and the processor may read the program and operate as the coupling column candidate extraction unit 112 and the coupling index generation unit 114 according to the program. Furthermore, the function of the coupling index construction device 110 may be provided in a software as a service (SaaS) format.

In addition, each of the coupling column candidate extraction unit 112 and the coupling index generation unit 114 may be implemented by dedicated hardware. In addition, some or all of the components of each device may be implemented by a general-purpose or dedicated circuitry, a processor, or the like, or a combination thereof. These may be implemented by a single chip or may be implemented by a plurality of chips connected via a bus. Some or all of the components of each device may be implemented by a combination of the above-described circuitry or the like and the program.

Furthermore, in a case where some or all of the components of the coupling index construction device 110 are implemented by a plurality of information processing devices, circuitries, and the like, the plurality of information processing devices, circuitries, and the like may be arranged in a centralized manner or in a distributed manner. For example, the information processing device, the circuitry, and the like may be implemented as a form in which each of a client server system, a cloud computing system, and the like is connected via a communication network.

The coupling index storage unit 120 stores the coupling index according to the similarity function. In the present exemplary embodiment, a case where the coupling index storage unit 120 stores the coupling index generated by the coupling index construction device 110 has been described, but the coupling index storage unit 120 may store a coupling index generated by another device (not illustrated).

The coupling table search device 130 searches for a table that is couplable to a column that is a target (hereinafter, referred to as a target column) in a base table from an external table group by using the coupling index. The coupling table search device 130 includes an input unit 132, a search plan generation unit 134, a record search unit 136, and a coupling table output unit 138.

The input unit 132 receives an input of the target column to be coupled to the external table among the columns included in the base table. In addition, the input unit 132 reads the coupling index stored in the coupling index storage unit 120. Note that the input unit 132 may read the coupling index from another storage device (not illustrated) other than the coupling index storage unit 120.

The search plan generation unit 134 analyzes a record in the target column before performing a search using the coupling index for each similarity function, and generates a search plan that defines a use order of the coupling index at the time of searching.

First, the search plan generation unit 134 calculates, for each coupling index, the number of couplable record pairs (hereinafter, referred to as the number of results) estimated in a case where the record in the target column is found using the coupling index for each similarity function. Examples of a method of estimating the number of results by using the coupling index for the similarity function include kernel density estimation and cardinality estimation. The search plan generation unit 134 may estimate the number of results for each coupling index by using these known estimation methods.

Next, the search plan generation unit 134 generates a search plan that defines the use order of the coupling index in descending order of the calculated number of results. The reason for defining the use order in this manner is as follows. There is a high possibility that many couplable record pairs can be found by performing a search using the coupling index estimated to have a large number of results. Then, the record of the external table group already determined to be couplable can be excluded from a search target in the subsequent coupling index, so that the search processing can be omitted. As a result, a cost for the search can be further reduced.

For example, it is assumed that there are coupling indexes A and B of two types of similarity functions. That is, the number F of similarity functions is 2 (F=2). Here, it is assumed that the number N of all records included in the external table group is 10 (N=10), and the number M of all records of the base table is 1 (M=1). Then, it is assumed that the number of results in a case of using the coupling index A for a record of a certain target column is two and the number of results in a case of using the coupling index B is five.

In a case where the search is performed by using the coupling index A and the coupling index B in this order, the calculation amount is log(10)+log(8). On the other hand, in a case where the search is performed by using the coupling index B and the coupling index A in this order, the calculation amount is log(10)+log(5). In this way, the use order of the coupling index is defined in descending order of the number of results, so that the calculation amount can be reduced.

The record search unit 136 searches for the record in the target column by using the coupling index in the order defined in the search plan. At this time, the record search unit 136 excludes a record in the external table that is found by an already used coupling index from the search target, and performs a search using a subsequent coupling index. Then, the record search unit 136 specifies, as the coupling table, an external table in which records whose number is equal to or larger than the predetermined threshold $T_c$ have been found as a result of searching for a record in the target column by using all the coupling indexes.

Figure 4:
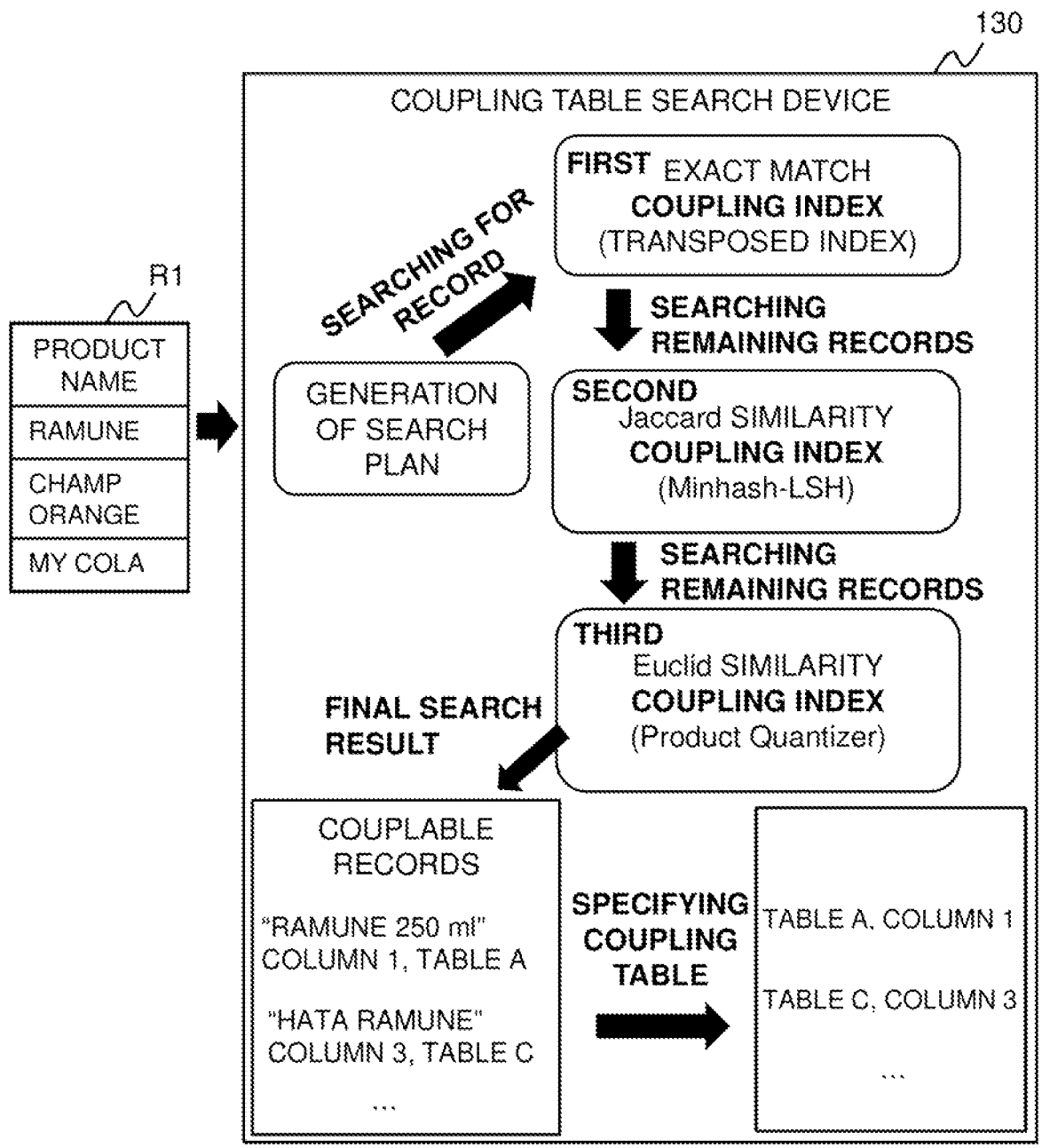
FIG. 4 It depicts an explanatory diagram illustrating an example of processing of specifying a coupling table of a target column.

FIG. 4 is an explanatory diagram illustrating an example of processing of specifying the coupling table of the target column. First, once the input unit 132 inputs a record R1 of the target column, the search plan generation unit 134 generates the search plan. In the example illustrated in FIG. 4, it is assumed that the search plan is generated as "First: exact match coupling index, Second: Jaccard similarity coupling index, Third: Euclidean distance coupling index".

Next, the record search unit 136 searches for the record R1 of the target column by using the coupling index in the order defined in the search plan. Here, the record search unit 136 first searches for the record R1 of the target column by using the exact match coupling index. As a result, a matching record group (hereinafter, referred to as a first record group) is found in the external table group. Next, the record search unit 136 excludes the first record group from the target and searches for the record R1 in the target column by using the Jaccard similarity coupling index. As a result, a matching record group (hereinafter, referred to as a second record group) is further found in the external table group. Then, the record search unit 136 excludes the first record group and the second record group from the target and searches for the record R1 in the target column by using the Euclidean distance coupling index. As a result, a matching record group (hereinafter, a third record group) is further found in the external table group.

As a result of this search, for example, it is assumed that a record "RAMUNE 250 ml" is found from a column 1 of a table A and a record "HATA RAMUNE" is found from a column 3 of a table C as illustrated in FIG. 4. The record search unit 136 specifies the table A including the record "RAMUNE 250 ml" as a table (coupling table) that is couplable through the column 1, and specifies the table C including the record "HATA RAMUNE" as a table (coupling table) that is couplable through the column 3.

The coupling table output unit 138 outputs the found coupling table. The coupling table output unit 138 may store the found coupling table in the coupling table storage unit 140.

The coupling table storage unit 140 stores a table that is couplable to the target column in the base table. The coupling table storage unit 140 may store, for example, a couplable base table in association with the coupling table. Note that the coupling table storage unit 140 may store the coupling table found by the coupling table search device 130, or may store a coupling table generated by another device (not illustrated).

The coupling index storage unit 120 and the coupling table storage unit 140 are implemented by, for example, a magnetic disk or the like.

The input unit 132, the search plan generation unit 134, the record search unit 136, and the coupling table output unit 138 are implemented by a processor of a computer that operates according to the program (coupling table search program).

For example, the program may be stored in a storage unit (not illustrated) included in the coupling table search device 130, and the processor may read the program and operate as the input unit 132, the search plan generation unit 134, the record search unit 136, and the coupling table output unit 138 according to the program. Furthermore, the function of the coupling table search device 130 may be provided in a SaaS format.

Figure 5:
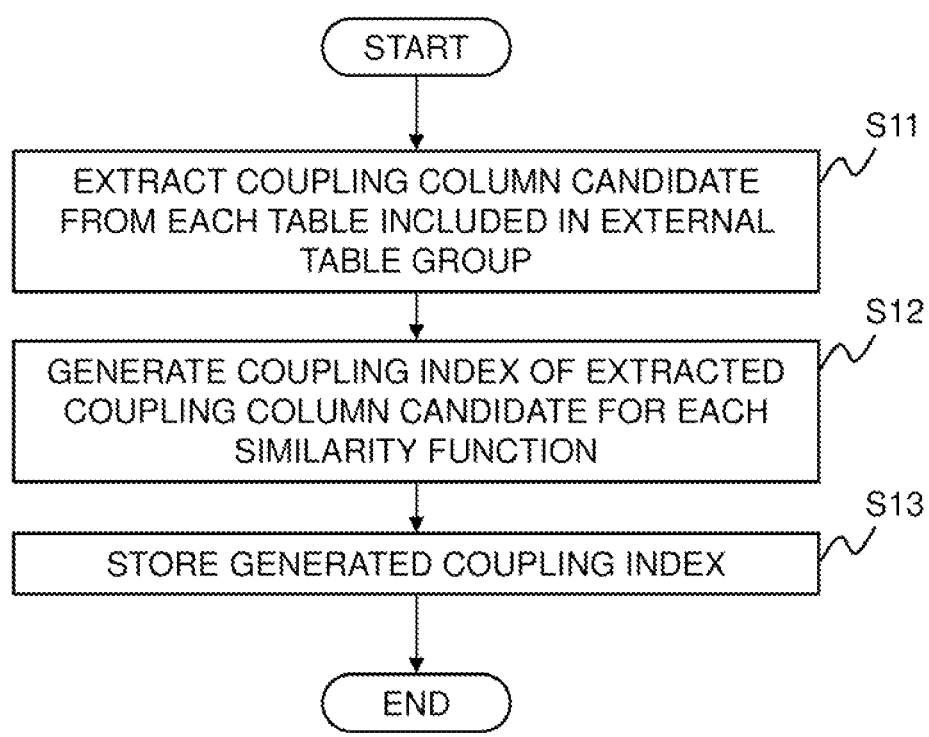
FIG. 5 It depicts a flowchart illustrating an operation example of a coupling index construction device.

Next, an operation of the coupling table specification system 100 of the present exemplary embodiment will be described. FIG. 5 is a flowchart illustrating an operation example of the coupling index construction device 110 of the present exemplary embodiment. The coupling column candidate extraction unit 112 extracts a coupling column candidate from each table included in the external table group (step S11). The coupling index generation unit 114 generates a coupling index of the extracted coupling column candidate for each similarity function (step S12). Then, the coupling index generation unit 114 stores the generated coupling index in the coupling index storage unit 120 (step S13).

Figure 6:
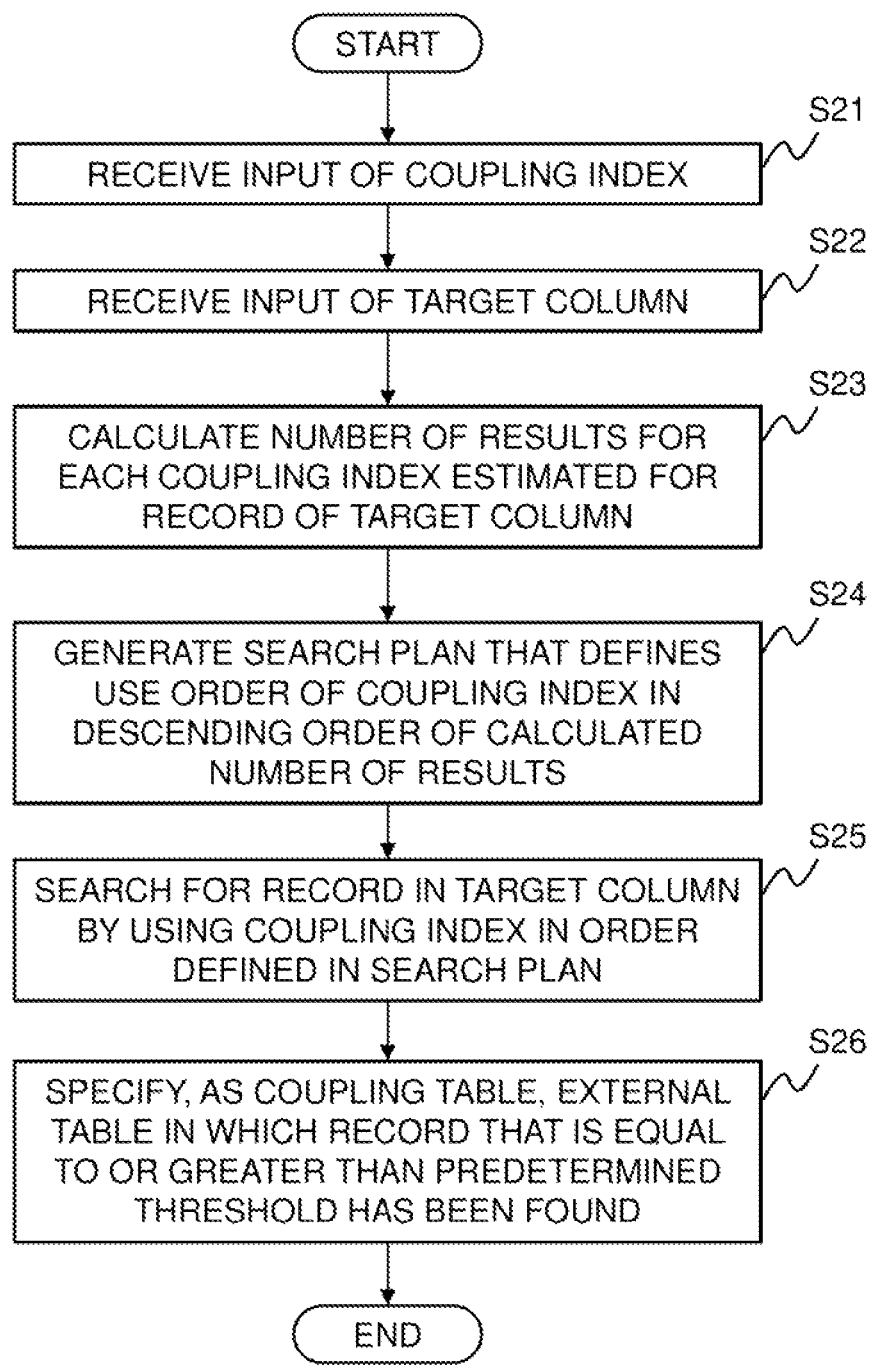
FIG. 6 It depicts a flowchart illustrating an operation example of a coupling table search device.

FIG. 6 is a flowchart illustrating an operation example of the coupling table search device 130 of the present exemplary embodiment. The input unit 132 receives an input of a coupling index from the coupling index storage unit 120 (step S21). In addition, the input unit 132 receives an input of a target column among columns included in a base table (step S22).

The search plan generation unit 134 calculates the number of results for each coupling index estimated for a record in the target column (step S23). Then, the search plan generation unit 134 generates a search plan that defines a use order of the coupling index in descending order of the calculated number of results (step S24).

The record search unit 136 searches for the record in the target column by using the coupling index in the order defined in the search plan (step S25). At this time, the record search unit 136 excludes a record in the external table that is found by an already used coupling index from the search target, and performs a search using a subsequent coupling index. Then, the record search unit 136 specifies, as the coupling table, an external table in which records whose number is equal to or larger than a predetermined threshold have been found (step S26).

As described above, in the present exemplary embodiment, the input unit 132 receives an input of a coupling index, the search plan generation unit 134 calculates the number of results for each coupling index, and generates the search plan that defines a use order of the coupling index in descending order of the calculated number of results. In addition, the record search unit 136 searches for a record in the target column by using the coupling index in the order defined in the search plan and specifies, as the coupling table, an external table in which records whose number is equal to or larger than a predetermined threshold have been found. At this time, the record search unit 136 excludes a record in the external table that is found by an already used coupling index from the search target, and performs a search using a subsequent coupling index. Therefore, a cost for specifying a table that is couplable to a target column can be reduced.

That is, in the coupling table specification system 100 of the present exemplary embodiment, since a search space can be pruned by using coupling indexes for different similarity functions, it is possible to quickly extract data that is couplable to base data from an external table group with a high accuracy.

Second Exemplary Embodiment

Figure 7:
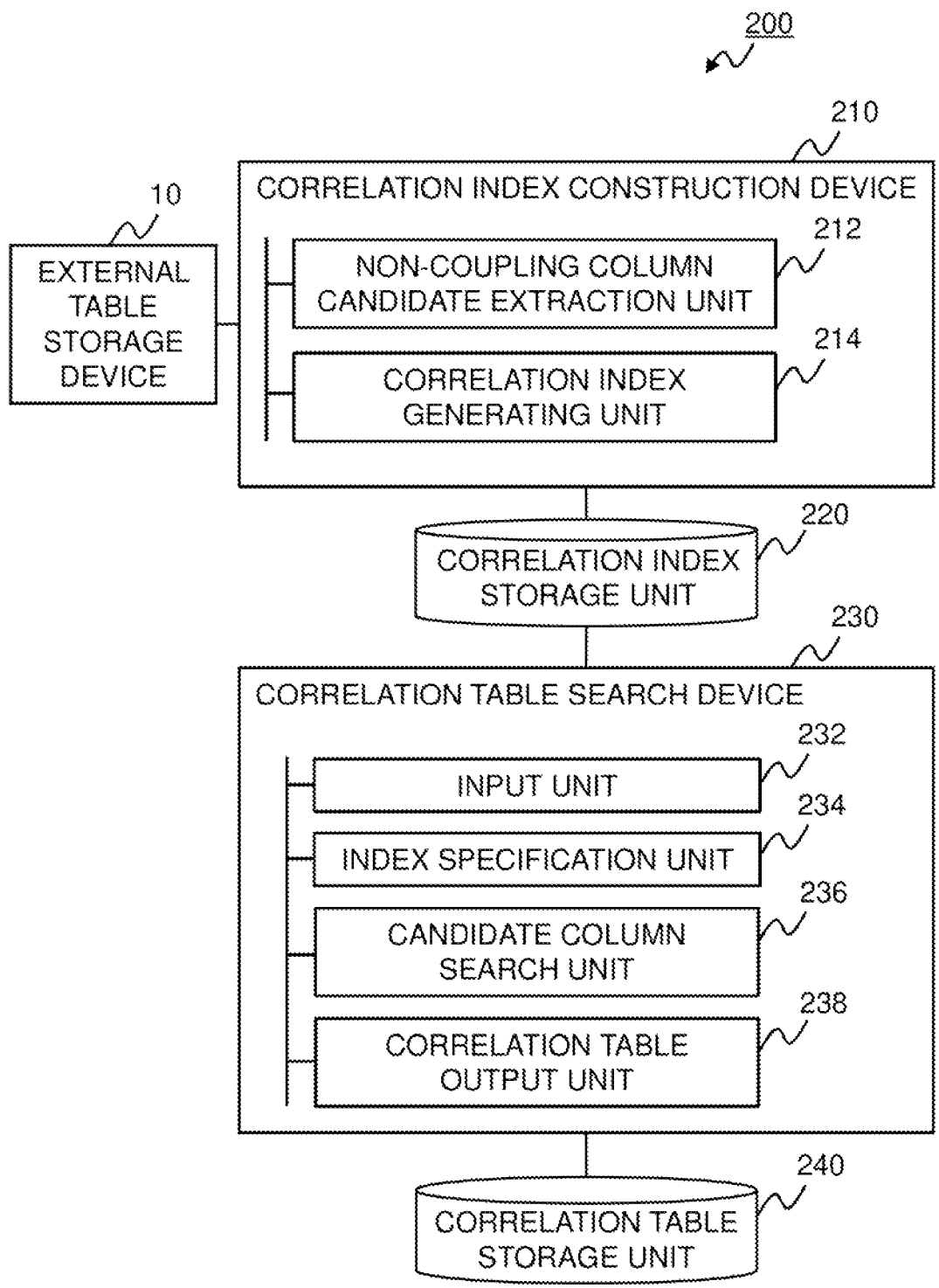
FIG. 7 It depicts a block diagram illustrating a configuration example of an exemplary embodiment of a correlation table specification system according to the present invention.

Next, a second exemplary embodiment of the present invention will be described. The second exemplary embodiment aims to quickly specify a table including a column including data correlated with data of a target column. FIG. 7 is a block diagram illustrating a configuration example of an exemplary embodiment of a correlation table specification system according to the present invention. A correlation table specification system 200 according to the present exemplary embodiment is a system that specifies an external table (hereinafter, referred to as a correlation table) including a column correlated with a target column.

In the present exemplary embodiment, the column correlated with the target column means a column of the external table group assumed to have any correlation with data included in the target column, and more specifically means a column of that external table group including a data group having a similar feature or distribution of a data group included in the target column. In addition, this correlation includes both a positive correlation and a negative correlation.

For example, it is assumed that there is a task of "predicting sales". At this time, the target column is a column including sales data included in a base table. In a case where there is a prediction model with sales as an objective variable, the correlated column corresponds to a column including an explanatory variable used as a feature that can affect the objective variable. Therefore, as the correlation table is specified, a more effective explanatory variable (feature) can be added to the prediction model for implementing the task of "predicting sales", and as a result, performance of the task can be improved.

Figure 8:
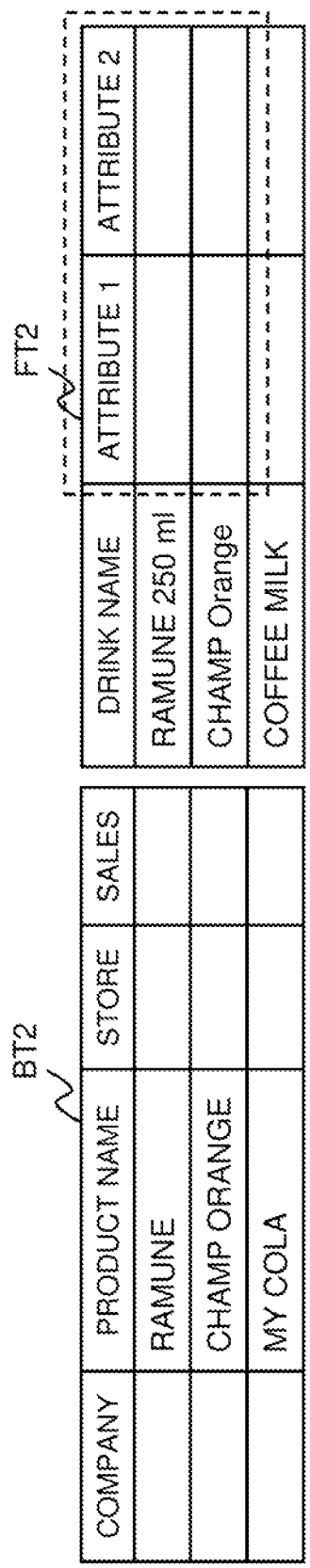
FIG. 8 It depicts an explanatory diagram illustrating an example of processing of extracting a correlated column.

FIG. 8 is an explanatory diagram illustrating an example of processing of extracting the correlated column. The reason for extracting the correlated column is to determine which table is useful for improving the performance of the task in the external table group. For example, it is assumed that tables are coupled through a column "product name" of a base table BT2 and a column "drink name" of an external table FT2 illustrated in FIG. 8. In this case, it is desirable to be able to determine whether columns (a column "attribute 1" or a column "attribute 2") other than the coupling column of the external table FT2 are useful for improving the performance of the task of predicting the column "sales" included in the base table.

In addition, in the present exemplary embodiment, a table contributing to the improvement of the performance of the task is defined as follows. That is, in a case where a certain external table is couplable to the base table through records whose number is equal to or larger than the threshold $T_c$, and there is a column in which a value (hereinafter, referred to as a correlation value) indicating the degree of correlation with a column of the base table that corresponds to the objective variable is equal to or higher than a threshold $T_p$ among columns associated by the coupling, the external table is set as a table contributing to the improvement of the performance of the task. Note that the present exemplary embodiment mainly aims to specify a column correlated with a target column, and it does not matter whether or not coupling to a base table is possible. In the following description, the threshold $T_p$ of the correlation value may be referred to as a correlation value threshold.

The correlation table specification system 200 illustrated in FIG. 7 includes an external table storage device 10, a correlation index construction device 210, a correlation index storage unit 220, a correlation table search device 230, and a correlation table storage unit 240.

Similarly to the first exemplary embodiment, the external table storage device 10 stores a plurality of external tables (that is, an external table group). The external table storage device is implemented by, for example, a storage server, a magnetic disk, or the like.

Also in the present exemplary embodiment, a case where the correlation table specification system 200 includes the external table storage device 10 will be described. However, the correlation index construction device 210 may acquire the external table group from a storage (not illustrated) or the like connected through a communication line. In this case, the correlation table specification system 200 does not have to include the external table storage device 10.

The correlation index construction device 210 is a device that constructs an index (hereinafter, referred to as a correlation index) of an external table group used for searching for a column correlated with a target column. The correlation index construction device 210 includes a non-coupling column candidate extraction unit 212 and a correlation index generation unit 214.

The non-coupling column candidate extraction unit 212 extracts, as a non-coupling column candidate, a column including a record that is assumed not to be a key of coupling to another table among external tables included in the external table group. In other words, the non-coupling column candidate extraction unit 212 extracts, as the non-coupling column candidate, a column other than the coupling column candidate extracted by the coupling column candidate extraction unit 112 of the first exemplary embodiment.

Similarly to the processing in the coupling column candidate extraction unit 112 of the first exemplary embodiment, for example, the non-coupling column candidate extraction unit 212 may estimate all column types of the external table group, determine whether or not a column of the estimated type is couplable to a column of another table, and extract the column as the non-coupling column candidate in a case where it is determined that the column of the estimated type is not couplable. At this time, similarly to the coupling column candidate extraction unit 112 of the first exemplary embodiment, for example, in a case where the estimated column type indicates a predetermined meaning or is an attribute of a predetermined character (for example, a numerical value type), the non-coupling column candidate extraction unit 212 may extract the column as the non-coupling column candidate.

For example, in the example illustrated in FIG. 3, the non-coupling column candidate extraction unit 212 may determine that data of a column meaning "age" or "grade" is unlikely to serve as the coupling key, and may extract a column 2 and a column 3 as the non-coupling column candidates. In addition, for example, a numerical value type column or a column having a small number of unique values is unlikely to serve as the coupling key. Therefore, the non-coupling column candidate extraction unit 212 may extract the numerical value type column 2 or the alphanumeric character type column 3 assumed to have a small number of unique values as the non-coupling column candidate.

The correlation index generation unit 214 generates a correlation index of an external table group. Specifically, the correlation index generation unit 214 generates a coupling index of the extracted non-coupling column candidates. In this way, a target of the index is limited to the non-coupling column candidate, so that a cost required to generate a correlation index and the size of a correlation index to be generated can be reduced.

In the present exemplary embodiment, the correlation index generation unit 214 generates, as the correlation index, an index for searching for a column whose correlation value is equal to or greater than a predetermined correlation value threshold from columns of an external table. As described above, the present exemplary embodiment aims to quickly specify a table including a column whose correlation value with a column of a base table is equal to or greater than the threshold $T_p$ in order to specify a table including a column including correlated data. However, it is difficult to construct an index for calculating a correlation value.

Therefore, the correlation index generation unit 214 first generates a feature vector indicating a feature of each column. Here, feature vectors of two columns are X and Y. Furthermore, the correlation index generation unit 214 calculates vectors (hereinafter, referred to as standardized vectors) (X',Y') obtained by standardizing the generated feature vectors. Furthermore, the correlation index generation unit 214 defines a function for calculating the correlation value based on a distance between the standardized vectors. That is, it can be said that this processing converts the calculation of the correlation value into calculation based on the distance.

Here, the function for calculating the correlation value is corr(X',Y'), and a function for calculating the distance is d(X',Y'). At this time, in a case where d(X',Y') is a function for calculating the Euclidean distance, the correlation index generation unit 214 may calculate the correlation value as in Equation 1 exemplified below, for example, as described in NPL 1.

[Math. 1]

$$\text{corr}(X',Y')=1-d^2(X',Y')/2 \qquad \text{(Equation 1)}$$

In this manner, the correlation index generation unit 214 defines the function for calculating the correlation value by using the distance, and generates the correlation index for searching for a column whose correlation value calculated by the distance to the feature vector of the target column is equal to or greater than the correlation value threshold by using the defined function. In accordance with this definition, the correlation index generation unit 214 may convert the correlation value threshold $T_p$ and define a threshold $T_d$ as in Equation 2 exemplified below. That is,

[Math. 2]

$$T_d=\sqrt{2(1-T_p)} \qquad \text{(Equation 2)}.$$

In the following description, the threshold $T_d$ determined based on the correlation value threshold $T_p$ may be referred to as a distance threshold.

Therefore, it is sufficient if the correlation index generation unit 214 determines columns whose distance therebetween is calculated to be equal to or less than the distance threshold $T_d$ as correlated columns. In this way, as the correlation value can be calculated based on the Euclidean distance, for example, it is possible to generate an index for searching for a record whose correlation value is equal to or greater than a predetermined threshold by using the known method (the method of generating the index according to the similarity function) as described in the first exemplary embodiment.

Here, the method of calculating the correlation value based on the Euclidean distance has been described. However, the method of calculating the correlation value is not limited to the method based on the Euclidean distance. A correlation value calculation method is arbitrary as long as it is a method capable of generating an index for searching for a record whose correlation value is equal to or greater than a predetermined threshold.

Then, the correlation index generation unit 214 generates the correlation index based on the standardized vectors (X',Y'). By generating such a correlation index, it is possible to quickly search for a column whose distance to the target column is smaller than the threshold $T_d$ from the external table group.

Note that, in a case where such a correlation index is used, it is simply necessary to calculate distances from the target column to all the columns of the external table group and compare the calculated distances with the threshold $T_d$. In a case where it is assumed that that the number of all columns of the external table group is C, the calculation amount is 0 (C).

It is also conceivable to generate an index of a distance to further improve a search speed. However, since a column to be coupled to the external table group is unknown in advance, using the distance index cannot solve this problem. Therefore, in the present exemplary embodiment, a correlation index capable of reducing the amount of data in columns to be compared and reducing a calculation cost required for search is created.

First, the correlation index generation unit 214 extracts a predetermined element in ascending order of the size of an element of the standardized vectors (X',Y'), and constructs the correlation index based on the extracted element. A method of constructing the correlation index is similar to the method of generating the coupling index in the first exemplary embodiment. For example, the correlation index generation unit 214 may generate the correlation index of the Euclidean distance search described above based on the extracted element.

In the following description, the number of extracted elements is referred to as a size, and a vector extracted from the feature vectors (standardized vectors) in ascending order of the size of an element of a predetermined size is referred to as a size-specific vector. A correlation index generated based on the size-specific vector is referred to as a size-specific correlation index. That is, the correlation index generation unit 214 generates the size-specific vector obtained by extracting an element of a predetermined size from the elements of the standardized vectors in ascending order, and generates the size-specific correlation index from the generated size-specific vector. Note that a method of generating the size-specific correlation index from the size-specific vector is similar to a method of creating an index for searching for a column whose distance is equal to or greater than a predetermined threshold.

The size-specific correlation index generated in this manner is an index for searching for a column whose correlation value indicating the degree of correlation between columns is equal to or larger than the correlation value threshold $T_p$ from the external table, and is an index generated for each size from the size-specific vector obtained by extracting an element of a predetermined size from the elements of the feature vectors of the columns in ascending order. In addition, the size-specific correlation index is an index for extracting a column whose distance to the size-specific vector is less than the distance threshold $T_d$ determined based on the correlation value threshold $T_p$.

The correlation index generation unit 214 may extract a predetermined number of elements from the standardized vectors, or may determine the number (size) of elements to be extracted based on distribution of the number of elements in each column. For example, the correlation index generation unit 214 may determine each of the maximum value of the number of elements, the minimum value of the number of elements, and the average value of the number of elements as the size. Furthermore, the correlation index generation unit 214 may generate one size-specific correlation index or may generate a plurality of size-specific correlation indexes.

For example, it is assumed that there are four columns P1 to P4, the number of elements of P1 is six, the number of elements of P2 is five, the number of elements of P3 is four, and the number of elements of P4 is two. At this time, the correlation index generation unit 214 may generate a correlation index of a size of 6, which is the maximum value of the number of elements, a correlation index of a size of 2, which is the minimum value of the number of elements, and a correlation index of a size of 4, which is the average value.

Hereinafter, a method of generating the correlation index will be described with a specific example. Here, it is assumed that two columns (feature vectors) of A=[5, 1, 2, 3, 4, 7] and B=[0, 7, 5, 3, 4, 9] exist, and correlation indexes of size 2, size 4, and size 6 are generated. At this time, the correlation index generation unit 214 may generate correlation indexes of three types of sizes exemplified below.

Correlation index of size 2: A[1,2], B[0,3]
Correlation index of size 4: A[1,2,3,4], B[0,3,4,5]
Correlation index of size 6: A[1,2,3,4,5,7], B[0,3,4,5,7,9]

Furthermore, the correlation index generation unit 214 may generate only a correlation index in which an element of a corresponding size exists. For example, for the four columns P1 to P4 described above, it is assumed that P1=[0,1,2,3,4,5], P2=[3,4,5,6,7], P3=[1,2,3,3], and P4=[0, 1]. At this time, the correlation index generation unit 214 may generate correlation indexes exemplified below.

Correlation index of size 2: P1[0,1], P2[3,4], P3[1,2], P4[0,1]
Correlation index of size 4: P1[0,1,2,3], P2[3,4,5,6], P3[1,2,3,3]
Correlation index of size 6: P1[0,1,2,3,4,5]

The correlation index generation unit 214 stores the generated correlation index in the correlation index storage unit 220. In addition, the correlation index generation unit 214 stores the generated size-specific correlation index in the correlation index storage unit 220.

The non-coupling column candidate extraction unit 212 and the correlation index generation unit 214 are implemented by a processor of a computer that operates according to a program (correlation index generation program). For example, the program may be stored in a storage unit (not illustrated) included in the correlation index construction device 210, and the processor may read the program and operate as the non-coupling column candidate extraction unit 212 and the correlation index generation unit 214 according to the program. Furthermore, the function of the correlation index construction device 210 may be provided in a SaaS format.

The correlation index storage unit 220 stores the correlation index and the size-specific correlation index. In the present exemplary embodiment, a case where the correlation index storage unit 220 stores the correlation index and the size-specific correlation index generated by the correlation index construction device 210 has been described. However, the correlation index storage unit 220 may store a correlation index and a size-specific correlation index generated by another device (not illustrated).

The correlation table search device 230 searches for a table including a column correlated with a column that is a target (that is, a target column) in a base table from an external table group by using the correlation index. The correlation table search device 230 includes an input unit 232, an index specification unit 234, a candidate column search unit 236, and a correlation table output unit 238.

The input unit 232 receives an input of the target column for which a correlated column of the external table group is found, among the columns included in the base table. In addition, the input unit 232 reads the correlation index stored in the correlation index storage unit 220. Note that the input unit 232 may read the correlation index from another storage device (not illustrated) other than the correlation index storage unit 220.

The index specification unit 234 specifies a correlation index to be used for searching. Specifically, the index specification unit 234 specifies a correlation index to be used for searching based on the threshold $T_c$ of the number of record pairs determined to be couplable when coupling a base table and an external table. Note that the value of the threshold $T_c$ is determined in advance by a user or the like.

The index specification unit 234 may determine to use a coupling index of the same size as the value of the threshold $T_c$ for searching. Note that, in a case where there is no coupling index of the same size as the value of the threshold $T_c$, the index specification unit 234 may determine to use a coupling index of the largest size among coupling indexes of sizes smaller than the value of the threshold $T_c$ for searching. This is because it is guaranteed that all pieces of data of a candidate column can be found by using a coupling index of a size smaller than the value of the threshold $T_c$.

For example, it is assumed that $T_c$=3 in a situation where the correlation index of size 2, the correlation index of size 4, and the correlation index of size 6 described above exist.

At this time, the index specification unit 234 determines to use the correlation index of size 2 equal to or smaller than 3 for searching.

Such determination is made for the following reasons. In a case where the threshold $T_c$ is given, the size of a column coupled to an external table is always equal to or larger than $T_c$. Therefore, a lower limit of the distance can be calculated by listing the element of the column including the objective variable and the element of the feature vector in ascending order of the size. Then, by comparing the lower limit of the distance with the threshold $T_d$, it can be determined whether or not to exclude the feature vector (that is, each column of the external table).

FIG. 9 is an explanatory diagram illustrating an example of processing of determining whether or not to exclude the feature vector. It is assumed that each of data of a column "sales" of a base table BT3 illustrated in FIG. 9 and data of a column "attribute 1" and a column "attribute 2" of an external table FT3 is standardized data. That is, each portion surrounded by a broken line illustrated in FIG. 9 corresponds to a feature vector.

As illustrated in FIG. 9, it is assumed that the feature vector of the column "sales" used as the objective variable is [1,3,5], the feature vector of the column "attribute 1" is [2,1,5], and the feature vector of the column "attribute 2" is [9,7,4]. In addition, it is assumed that the threshold $T_c$ is 2 ($T_c$=2) and the threshold $T_d$ is 2 ($T_d$=2).

In an initial state, it is unclear whether a column "item name" of the base table BT3 and a column "drink name" of the external table FT3 are couplable. In other words, it is unclear which record of the external table FT3 is coupled to the record of the base table BT3.

Even in such a state, the lower limit of the distance between the column "sales" and the column "attribute 1" can be calculated as d([1,3],[1,2])=1 by comparing elements having small values. Since this value is smaller than the threshold $T_d$=2, the columns may be correlated columns. Therefore, it is determined that the column "attribute 1" is a target on which subsequent processing is to be performed.

On the other hand, the lower limit of the distance between the column "sales" and the column "attribute 2" can be calculated as d([1,3],[4,7])=3 by comparing elements having small values. Since this value is larger than the threshold $T_d$=2, the distance is not smaller than $T_d$ even in a case where the distance is calculated with any other element. Therefore, the column "attribute 2" is determined as a column having no correlation, and can be excluded from subsequent processing.

The candidate column search unit 236 searches the external table group by using the correlation index determined for the target column, and searches for a candidate column assumed to be correlated. Specifically, the candidate column search unit 236 searches for a column equal to or larger than a predetermined threshold (here, the distance threshold TO from the external table group by using the correlation index. Note that a method of searching for a column equal to or larger than a predetermined threshold (here, the distance threshold TO by using the correlation index (for example, the correlation index of Euclidean distance search) is widely known, and thus a detailed description thereof is omitted here.

Then, the candidate column search unit 236 calculates a correlation value between the target column and the found column, and specifies a column equal to or larger than a predetermined threshold (here, the threshold $T_p$ of the correlation value) as the candidate column. In this manner, the candidate column search unit 236 searches for the column by the correlation index and calculates the correlation value for the found column, so that the correlation value can be calculated only for a column assumed to be more correlated, and thus a calculation cost can be reduced.

The correlation table output unit 238 outputs the external table including the candidate column as a correlation table. The correlation table output unit 238 may store the correlation table in the correlation table storage unit 240.

Figure 10:
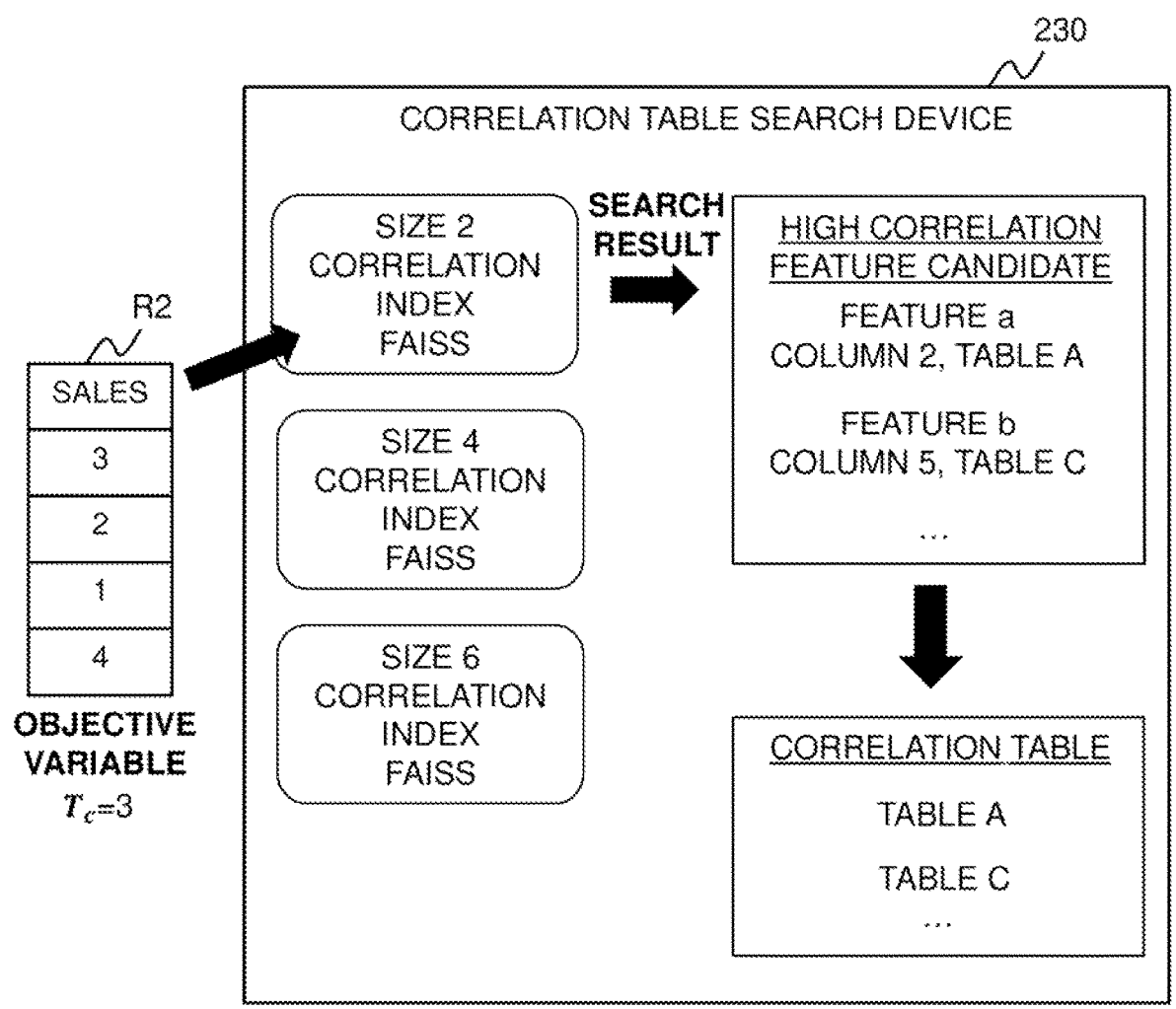
FIG. 10 It depicts an explanatory diagram illustrating an example of processing of specifying a correlation table.

FIG. 10 is an explanatory diagram illustrating an example of processing of specifying the correlation table. In the example illustrated in FIG. 10, it is assumed that a target column R2 of a base table is a column indicating "sales" which is an objective variable, and the threshold $T_c$ is 3 ($T_c$=3). In this case, the index specification unit 234 determines to use the correlation index of size 2 equal to or smaller than the threshold for searching.

The candidate column search unit 236 searches for a column including a highly correlated feature by using the correlation index of size 2. The example illustrated in FIG. 10 indicates that a column 2 of a table A is found as a column including a feature a, and a column 5 of a table C is found as a column including a feature b. Then, the candidate column search unit 236 calculates the correlation value again between the target column and the candidate column, and the correlation table output unit 238 outputs the table A and the table C including the candidate column.

The correlation table storage unit 240 stores the correlation table including the candidate column. The correlation table storage unit 240 may store a correlated column (that is, the candidate column) in association with the target column of the base table. For example, in the above example, the correlation table storage unit 240 may store the column "sales", which is the target column that can be the objective variable of the task, and the candidate column in the correlation table in association with each other. Note that the correlation table storage unit 240 may store the correlation table output by the correlation table search device 230 or may store a correlation table generated by another device (not illustrated).

The correlation index storage unit 220 and the correlation table storage unit 240 are implemented by, for example, a magnetic disk or the like.

The input unit 232, the index specification unit 234, the candidate column search unit 236, and the correlation table output unit 238 are implemented by a processor of a computer that operates according to a program (correlation table searching program).

For example, the program may be stored in a storage unit (not illustrated) included in the correlation table search device 230, and the processor may read the program and operate as the input unit 232, the index specification unit 234, the candidate column search unit 236, and the correlation table output unit 238 according to the program.

Figure 11:
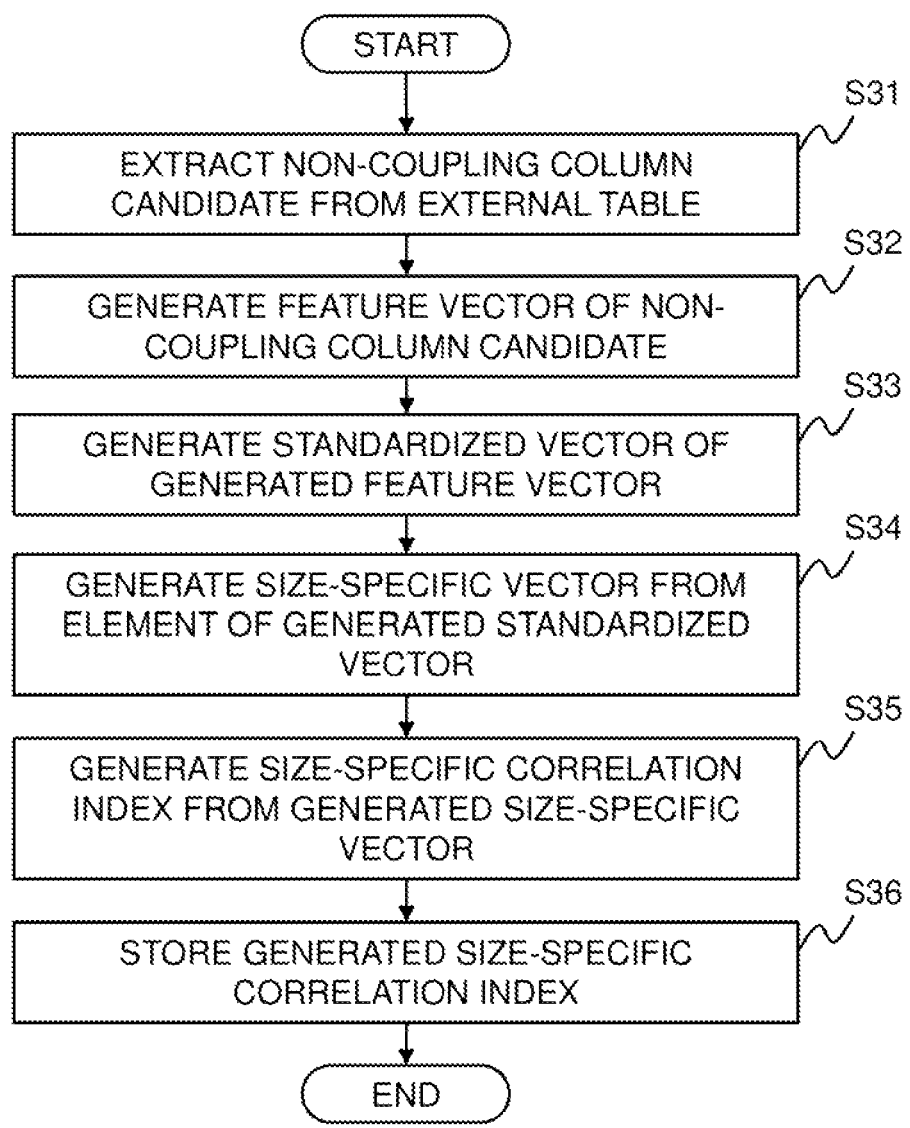
FIG. 11 It depicts a flowchart illustrating an operation example of a correlation index construction device.

Next, an operation of the correlation table specification system 200 according to the present exemplary embodiment will be described. FIG. 11 is a flowchart illustrating an operation example of the correlation index construction device 210 according to the present exemplary embodiment. The non-coupling column candidate extraction unit 212 extracts a non-coupling column candidate from an external table (step S31). The correlation index generation unit 214 generates a feature vector indicating a feature of the non-coupling column candidate (step S32), and generates a standardized vector obtained by standardizing the generated feature vector (step S33).

In addition, the correlation index generation unit 214 generates a size-specific vector obtained by extracting an element of a predetermined size from the elements of the generated standardized vector in ascending order (step S34), and generates a size-specific correlation index for each size from the generated size-specific vector (step S35). Then, the correlation index generation unit 214 stores the generated size-specific correlation index in the correlation index storage unit 220 (step S36).

Figure 12:
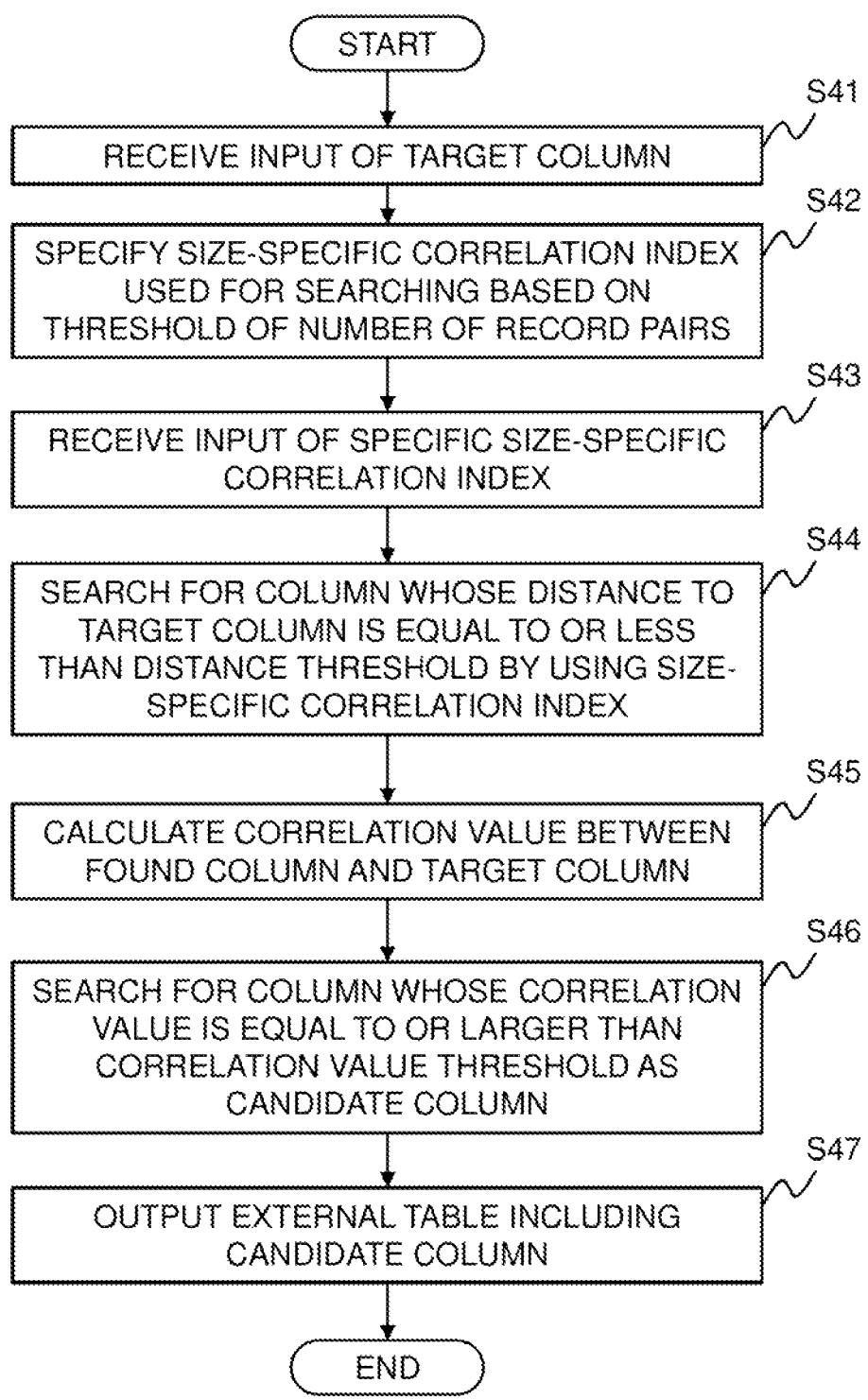
FIG. 12 It depicts a flowchart illustrating an operation example of a correlation table search device.

FIG. 12 is a flowchart illustrating an operation example of the correlation table search device 230 according to the present exemplary embodiment. The input unit 232 receives an input of a target column among columns included in a base table (step S41). The index specification unit 234 specifies a size-specific correlation index to be used for searching among the size-specific correlation indexes stored in the correlation index storage unit 220 based on the threshold $T_c$ of the number of record pairs (step S42). The input unit 232 receives an input of the specified size-specific correlation index (step S43).

The candidate column search unit 236 uses the specified size-specific correlation index to search for a column whose distance to the target column is equal to or less than the distance threshold from the external table (step S44). The candidate column search unit 236 calculates a correlation value between the found column and the target column (step S45), and searches for a column whose correlation value is equal to or larger than the correlation value threshold as a candidate column (step S46). Then, the correlation table output unit 238 outputs the external table including the candidate column as a correlation table (step S47).

As described above, in the present exemplary embodiment, the input unit 232 receives an input of the size-specific correlation index, and the index specification unit 234 specifies the size-specific correlation index to be used for searching among the size-specific correlation indexes based on the threshold $T_c$ of the number of record pairs. In addition, the candidate column search unit 236 searches for a column whose distance to the target column is equal to or less than the distance threshold $T_d$ from the external table by using the specified size-specific correlation index, calculates a correlation value indicating the degree of correlation between the found column and the target column, and searches for a column whose correlation value is equal to or larger than the correlation value threshold $T_p$ as a candidate column. Then, the correlation table output unit 238 outputs the external table including the candidate column. Therefore, a table including data correlated with data of a target column can be quickly specified.

In the present exemplary embodiment, the correlation index generation unit 214 generates the correlation index. At this time, the correlation index generation unit 214 generates a feature vector indicating a feature of each column of the external table, generates a standardized vector obtained by standardizing the generated feature vector, generates a size-specific vector obtained by extracting an element of a predetermined size from elements of the generated standardized vector in ascending order, and generates a size-specific correlation index from the generated size-specific vector. In addition, the correlation index generation unit 214 defines a function for calculating the correlation value by using a distance to the size-specific vector, and generates the correlation index for searching for a column of the external table of which the correlation value calculated by a distance between the feature vector of a target column and the size-specific vector is equal to or larger than the correlation value threshold by using the defined function. By generating such a correlation index (size-specific correlation index) in advance, the correlation table search device 230 can quickly specify a table including data correlated with data of a target column.

Third Exemplary Embodiment

Figure 13:
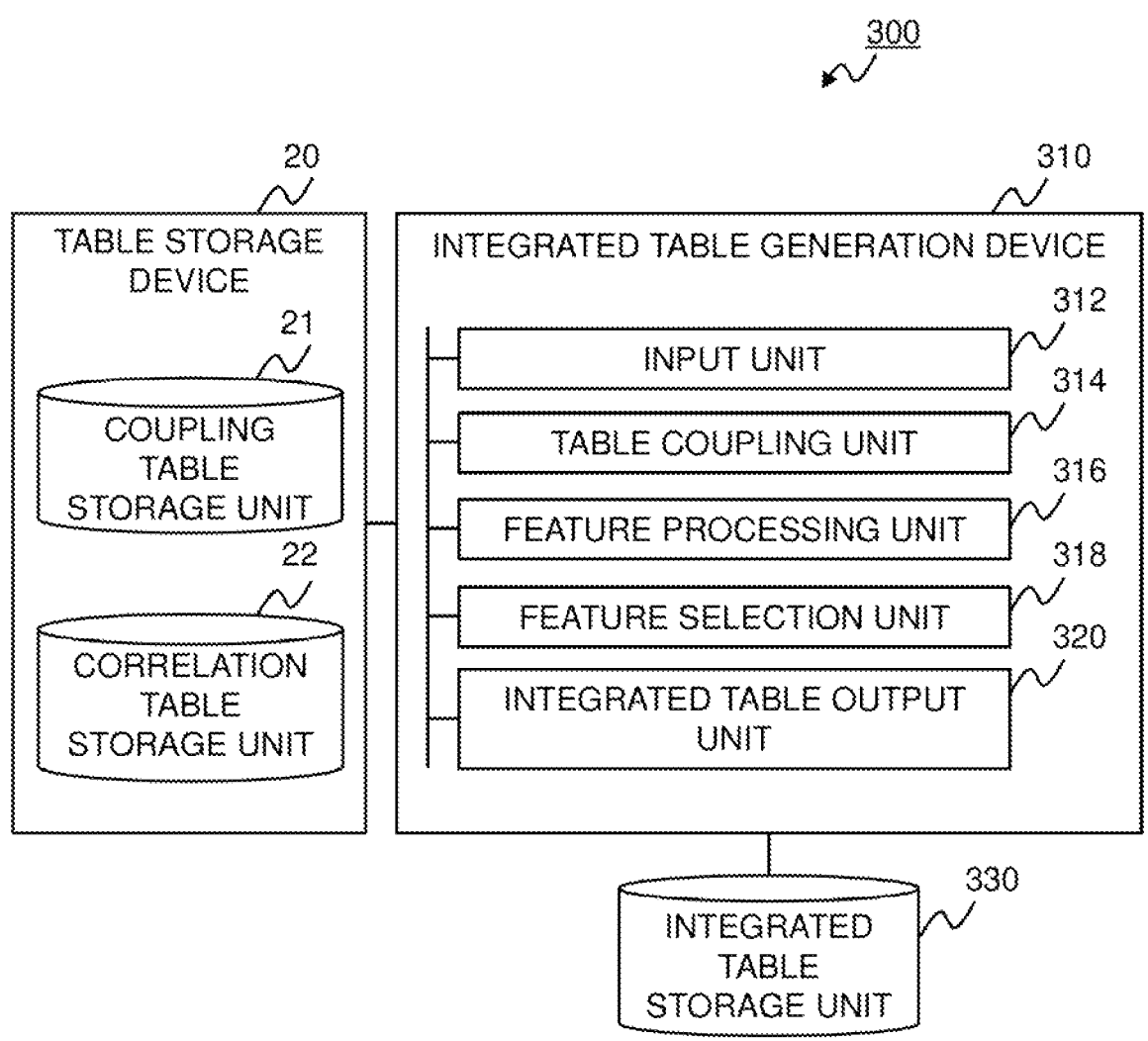
FIG. 13 It depicts a block diagram illustrating a configuration example of an exemplary embodiment of a table integration system according to the present invention.

Next, a third exemplary embodiment of the present invention will be described. The third exemplary embodiment aims to efficiently integrate correlated data with a table including a target column. FIG. 13 is a block diagram illustrating a configuration example of an exemplary embodiment of a table integration system according to the present invention. A table integration system 300 of the present exemplary embodiment is a system that integrates a column correlated with a target column included in a base table.

In the present exemplary embodiment, integrating an external table with a base table refers to processing of coupling an external table (that is, a coupling table) that is couplable to a base table to generate a new table as described in the first exemplary embodiment.

Furthermore, in the present exemplary embodiment, the target column is a column including target data in an assumed task, and is, for example, a column including an objective variable of a prediction model. Furthermore, the task means prediction (estimation) processing such as regression and classification performed using a selected feature, and is specifically given by a function or the like indicating the prediction model.

In addition, in the present exemplary embodiment, the column correlated with the target column means a column of an external table group assumed to have any correlation with data included in the target column, and more specifically means a column of an external table group including a data group having a similar feature or distribution of a data group included in the target column, similarly to the second exemplary embodiment. In addition, this correlation includes both a positive correlation and a negative correlation.

In addition, similarly to the second exemplary embodiment, the correlated column corresponds to a column including an explanatory variable used as a feature that can affect the objective variable. Therefore, as such a column is integrated with the base table, the performance of the task can be improved.

The table integration system 300 illustrated in FIG. 13 includes a table storage device 20, an integrated table generation device 310, and an integrated table storage unit 330.

The table storage device 20 stores a plurality of external tables (that is, an external table group). Unlike the external table storage devices 10 of the first and second exemplary embodiments, the table storage device 20 of the present exemplary embodiment stores an external table group extracted from a predetermined viewpoint. The table storage device 20 includes a coupling table storage unit 21 and a correlation table storage unit 22.

The coupling table storage unit 21 stores a coupling table (that is, an external table that is couplable to a base table) described in the first exemplary embodiment. It is assumed that the coupling table storage unit 21 stores the couplable base table in association with the coupling table. The coupling table storage unit 21 may store the coupling table specified by the coupling table specification system 100 of the first exemplary embodiment, or may store a coupling table generated by another system (not illustrated) or the like.

The correlation table storage unit 22 stores a correlation table (that is, an external table including a column correlated with a target column) described in the second exemplary embodiment. The correlation table storage unit 22 may store the correlation table specified by the correlation table specification system 200 of the second exemplary embodiment, or may store a correlation table generated by another system (not illustrated) or the like.

In the present exemplary embodiment, as described in the second exemplary embodiment, it is assumed that the correlation table storage unit 22 stores a column (that is, a candidate column) including data correlated with data of a target column in association with the target column of a base table. In addition, the correlation table storage unit 22 of the present exemplary embodiment only needs to store information by which a column of a table correlated with the target column can be specified, and does not necessarily need to store data of each column. That is, the correlation table storage unit 22 may store the candidate column (that is, a column whose correlation value with respect to the target column is equal to or larger than a predetermined threshold $T_p$) described in the second exemplary embodiment.

In the present exemplary embodiment, it is assumed that the coupling table is generated in advance by, for example, the method described in the first exemplary embodiment and stored in the coupling table storage unit 21. In addition, it is assumed that the candidate column is also generated in advance by, for example, the method described in the second exemplary embodiment and stored in the correlation table storage unit 22.

The integrated table generation device 310 is a device that generates an integrated table obtained by coupling the base table and the candidate column. The integrated table generation device 310 includes an input unit 312, a table coupling unit 314, a feature processing unit 316, a feature selection unit 318, and an integrated table output unit 320.

The input unit 312 receives an input of the base table and designation of the target column. In addition, the input unit 312 receives an input of the coupling table and the candidate column. Note that the input unit 312 may receive designation of the objective variable of the task. In this case, the input unit 312 may specify the target column of the corresponding base table from the designated objective variable.

When the input of the base table and the designation of the target column are received, the input unit 312 may acquire the coupling table for the input base table from the coupling table storage unit 21 and acquire the candidate column for the target column from the correlation table storage unit 22.

The table coupling unit 314 couples a column corresponding to the candidate column in the coupling table to the base table. Specifically, the table coupling unit 314 extracts the candidate column from the coupling table, and couples the extracted candidate column of the coupling table to the base table.

Note that a method of coupling the tables is arbitrary. The table coupling unit 314 may couple the coupling table to the base table by an arbitrary method such as left-join or out-join. Note that a table after coupling may be referred to as an integrated table.

Figure 14:
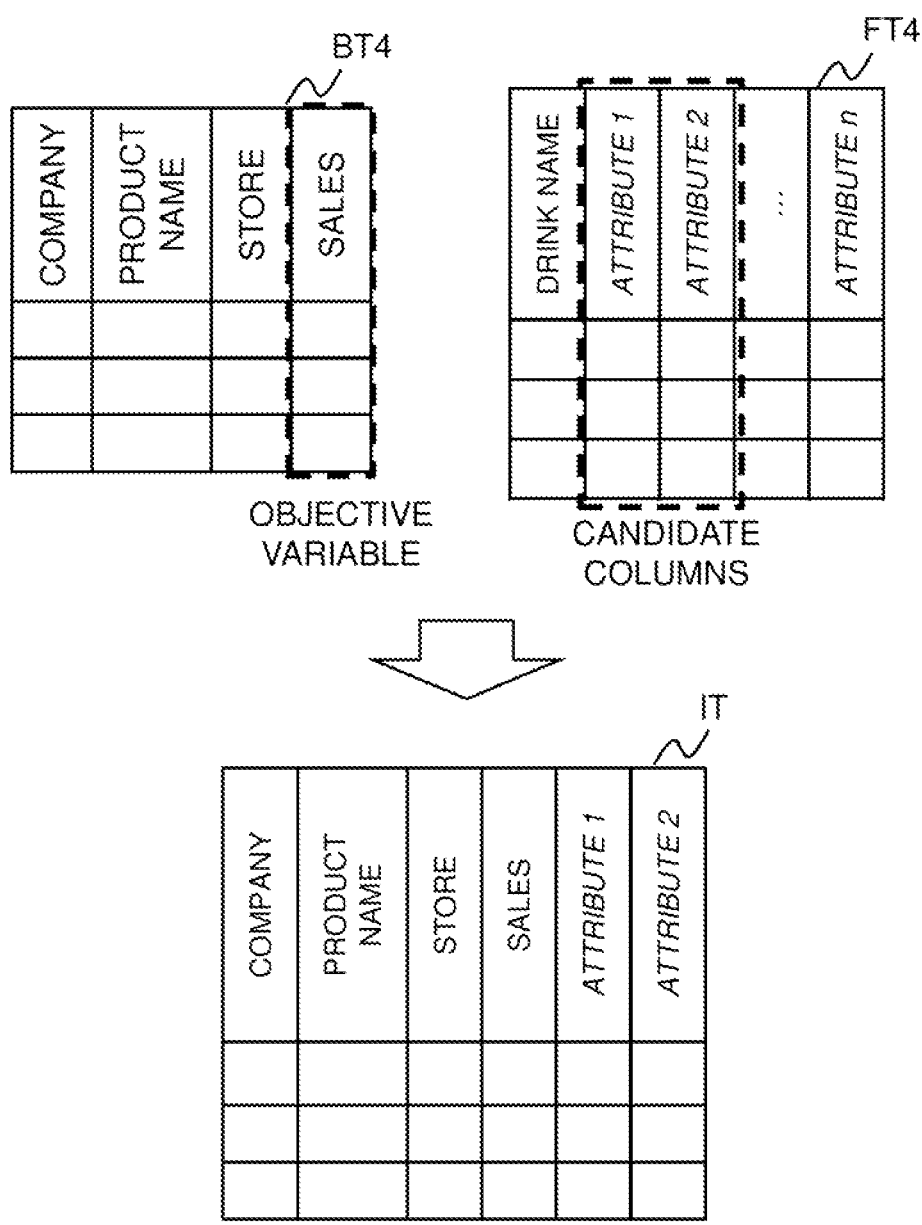
FIG. 14 It depicts an explanatory diagram illustrating an example of processing of coupling tables.

FIG. 14 is an explanatory diagram illustrating an example of processing of coupling tables. In the example illustrated in FIG. 14, it is assumed that a base table BT4 including a column "sales" including data used as the objective variable as the target column and a couplable external table (coupling table) FT4 exist. In addition, it is assumed that the external table FT4 is a correlation table including a column "attribute 1" and a column "attribute 2" which are columns (correlation columns) determined to be correlated with the target column. In the external table FT4, a column "drink name" is a coupling column candidate, and the columns "attributes 1 to n" correspond to non-coupling column candidates.

The table coupling unit 314 extracts the column "attribute 1" and the column "attribute 2" from the external table FT4. In other words, the table coupling unit 314 deletes columns (the non-coupling column candidates) other than the column "drink name", the column "attribute 1", and the column "attribute 2" from the external table FT4. Then, the table coupling unit 314 couples the column "item name" and the column "drink name" of the base table BT4, and couples the column "attribute 1" and the column "attribute 2" to generate an integrated table IT.

The feature processing unit 316 generates a feature for data of the target column from data of a column included in the integrated table. The feature processing unit 316 can use various methods for generating the feature. For example, it is assumed that a missing value exists in the integrated table according to the coupling method (for example, left-join) or an original table state. In this case, the feature processing unit 316 may compensate for the missing value by estimating data distribution by a known method or using external knowledge information or the like.

In addition, the feature processing unit 316 may generate one or more column sets (clusters) by clustering selected columns based on the distribution of data in each column. Note that a method of clustering the columns is also arbitrary, and the feature processing unit 316 may cluster the columns by using, for example, the method described in NPL 2.

Then, the feature processing unit 316 may generate the feature for each clustered column set (cluster). Note that a method of generating the feature is also arbitrary, and the feature may be generated based on a predetermined method. For example, the feature processing unit 316 may couple all columns included in one cluster to generate the feature. In addition, the feature processing unit 316 may select one column from one cluster by a predetermined method (for example, a column having the largest number of unique values is selected) to generate the feature.

The feature selection unit 318 selects a feature that improves performance of a predetermined task based on data included in the coupled candidate column or the feature generated from the candidate column. Here, improving the performance of the task means improving any evaluation index related to the task, and more specifically, improving prediction accuracy and the like. The evaluation index used at the time of selection is arbitrary and determined in advance.

Hereinafter, a specific method of selecting the feature will be described. Here, it is assumed that a trained model that predicts sales of a product by learning is used as the task. In this case, the feature selection unit 318 selects the feature that improves performance of the task of predicting the data of the target column.

In a case of a task of performing sales prediction, data of "sales" included in the target column is used as the objective variable, and data of each column included in the coupling table is used as the feature (explanatory variable). That is, each record of the integrated table corresponds to training data. Note that a mode of the trained model is arbitrary, and examples thereof include a linear model and a random forest.

First, the feature selection unit 318 selects one or more features among the generated features by a predetermined method. Note that the method of selecting the feature is not limited, and the feature selection unit 318 may select the feature by using an arbitrary feature selection technology. Then, the feature selection unit 318 trains the model by using the selected feature.

Then, the feature selection unit 318 evaluates the trained model based on a predetermined evaluation method, and selects a feature that improves the calculated evaluation index. Note that the evaluation method is also not particularly limited, and the feature selection unit 318 may evaluate the trained model based on the f1 score of cross validation, for example.

In addition, the feature selection unit 318 may generate a plurality of trained models of the same mode and aggregate (an average, a weighted average, or the like) evaluation results of the plurality of trained models, or may generate a plurality of trained models of different modes (for example, a linear model and a random forest) and aggregate evaluation results of the plurality of trained models.

Then, the feature selection unit 318 selects one or more features with higher evaluations. For example, in a case where a feature is selected and learned by a forward method (step forward), the feature selection unit 318 may select a combination of features having the highest evaluation index. However, the method of selecting the feature is not limited to this method, and any method may be used.

The integrated table output unit 320 outputs an integrated table obtained by coupling a column including the selected feature and the base table. In other words, the integrated table output unit 320 outputs an integrated table in which a column from which the selected feature is generated is left. The integrated table output unit 320 may store the integrated table in the integrated table storage unit 330.

The integrated table storage unit 330 stores a table (that is, the integrated table) obtained by coupling the column of the external table with the base table.

The coupling table storage unit 21, the correlation table storage unit 22, and the integrated table storage unit 330 are implemented by, for example, a magnetic disk or the like.

The input unit 312, the table coupling unit 314, the feature processing unit 316, the feature selection unit 318, and the integrated table output unit 320 are implemented by a processor of a computer that operates according to a program (integrated table generation program).

For example, the program may be stored in a storage unit (not illustrated) included in the integrated table generation device 310, and the processor may read the program and operate as the input unit 312, the table coupling unit 314, the feature processing unit 316, the feature selection unit 318, and the integrated table output unit 320 according to the program. In addition, the function of the integrated table generation device 310 may be provided in a SaaS format.

Figure 15:
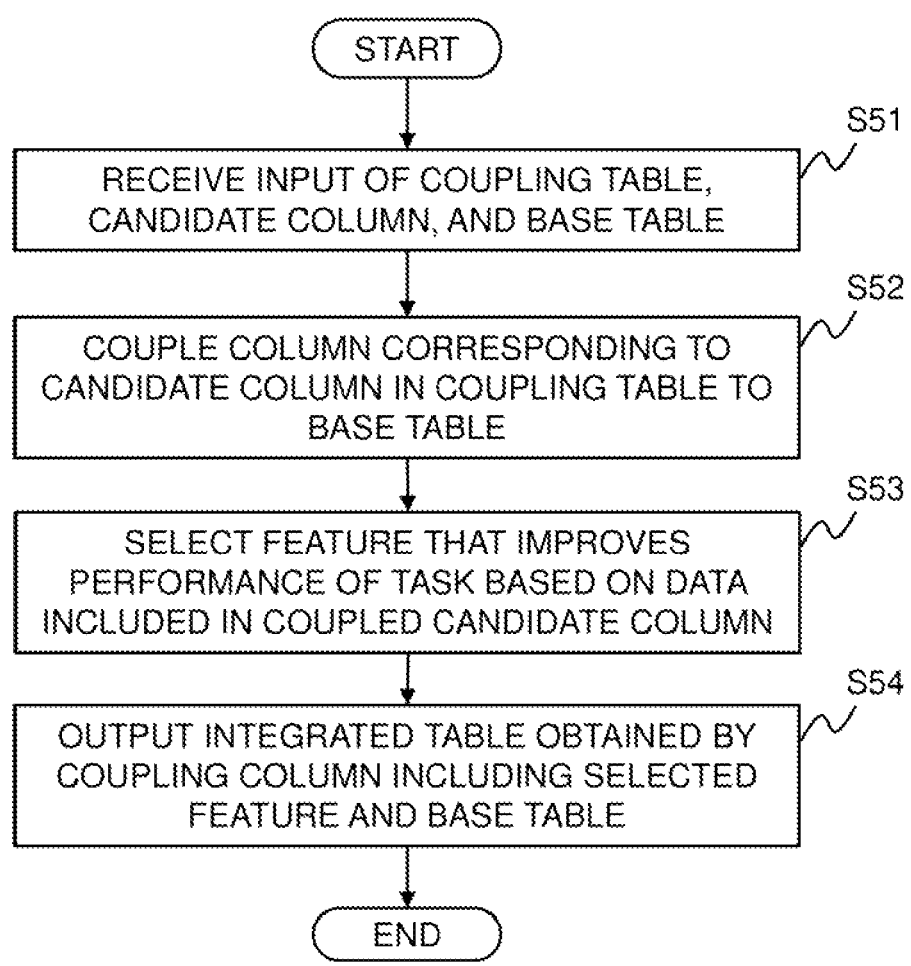
FIG. 15 It depicts a flowchart illustrating an operation example of an integrated table generation device.

Next, an operation of the table integration system 300 of the present exemplary embodiment will be described. FIG. 15 is a flowchart illustrating an operation example of the integrated table generation device 310 of the present exemplary embodiment. The input unit 312 receives an input of a coupling table, a candidate column, and a base table (step S51). The table coupling unit 314 couples a column corresponding to a candidate column in the coupling table with the base table (step S52). Note that the feature processing unit 316 may generate a feature from data included in the coupled column.

The feature selection unit 318 selects a feature that improves performance of a task based on data included in the coupled candidate column (step S53). Then, the integrated table output unit 320 outputs an integrated table obtained by coupling a column including the selected feature and the base table (step S54).

As described above, in the present exemplary embodiment, the input unit 312 receives an input of a coupling table, a candidate column, and a base table, and the table coupling unit 314 couples a column corresponding to a candidate column in the coupling table with the base table. Then, the feature selection unit 318 selects a feature that improves performance of a task based on data included in the coupled candidate column, and the integrated table output unit 320 outputs an integrated table obtained by coupling a column including the selected feature and the base table. Therefore, correlated data can be efficiently integrated with a table including a target column.

Fourth Exemplary Embodiment

Next, a fourth exemplary embodiment of the present invention will be described. In a fourth exemplary embodiment, a method of efficiently integrating correlated data with respect to a table including a target column by combining the systems of the first to third exemplary embodiments will be described.

Figure 16:
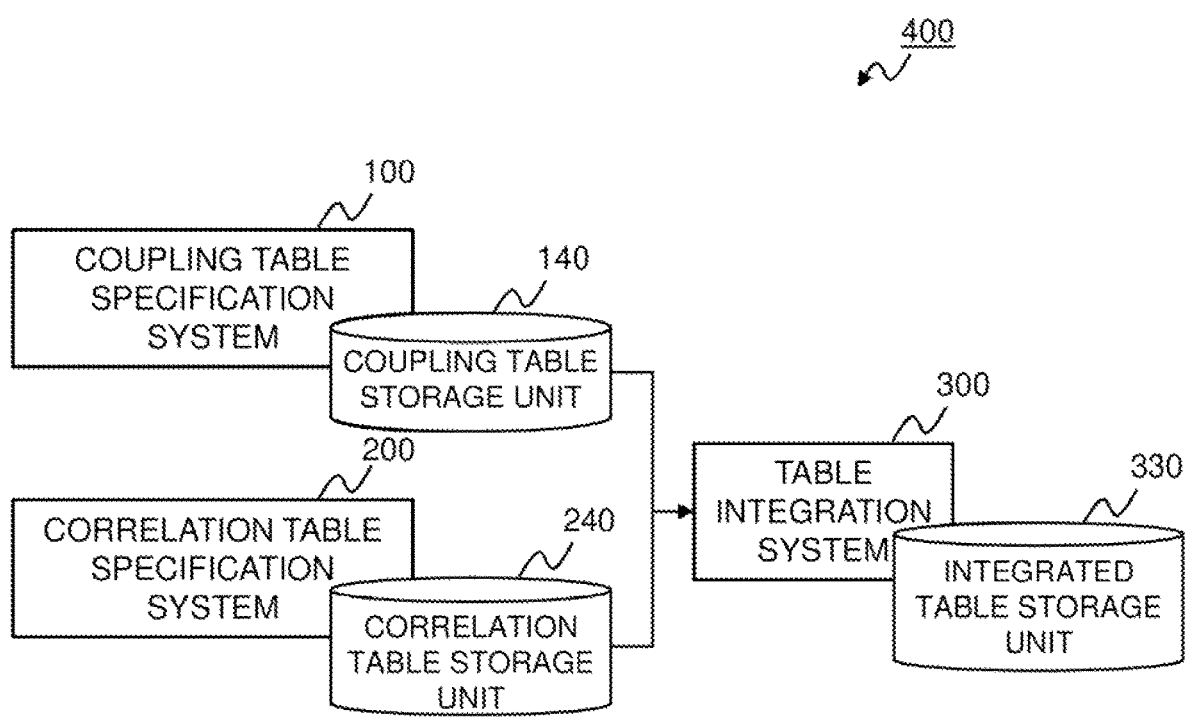
FIG. 16 It depicts a block diagram illustrating a configuration example of an exemplary embodiment of an external data utilization system according to the present invention.

FIG. 16 is a block diagram illustrating a configuration example of an exemplary embodiment of an external data utilization system according to the present invention. An external data utilization system 400 illustrated in FIG. 16 includes the coupling table specification system 100 according to the first exemplary embodiment, the correlation table specification system 200 according to the second exemplary embodiment, and the table integration system 300 according to the third exemplary embodiment.

The coupling table specification system 100 stores, in the coupling table storage unit 140, a coupling table for a base table generated based on the processing described in the first exemplary embodiment. In addition, the correlation table specification system 200 stores, in the correlation table storage unit 240, a correlation table and a candidate column generated based on the processing described in the second exemplary embodiment. Then, the table integration system 300 acquires a coupling table for a base table from the coupling table storage unit 140 based on the processing described in the third exemplary embodiment, acquires a correlation table (candidate column) for a target column from the correlation table storage unit 240, generates an integrated table, and stores the integrated table in the integrated table storage unit 330.

The coupling table generation processing performed by the coupling table specification system 100 and the correlation table generation processing performed by the correlation table specification system 200 can be separately and independently performed at any timing. Therefore, correlated data can be efficiently integrated with a base table as necessary.

Figure 17:
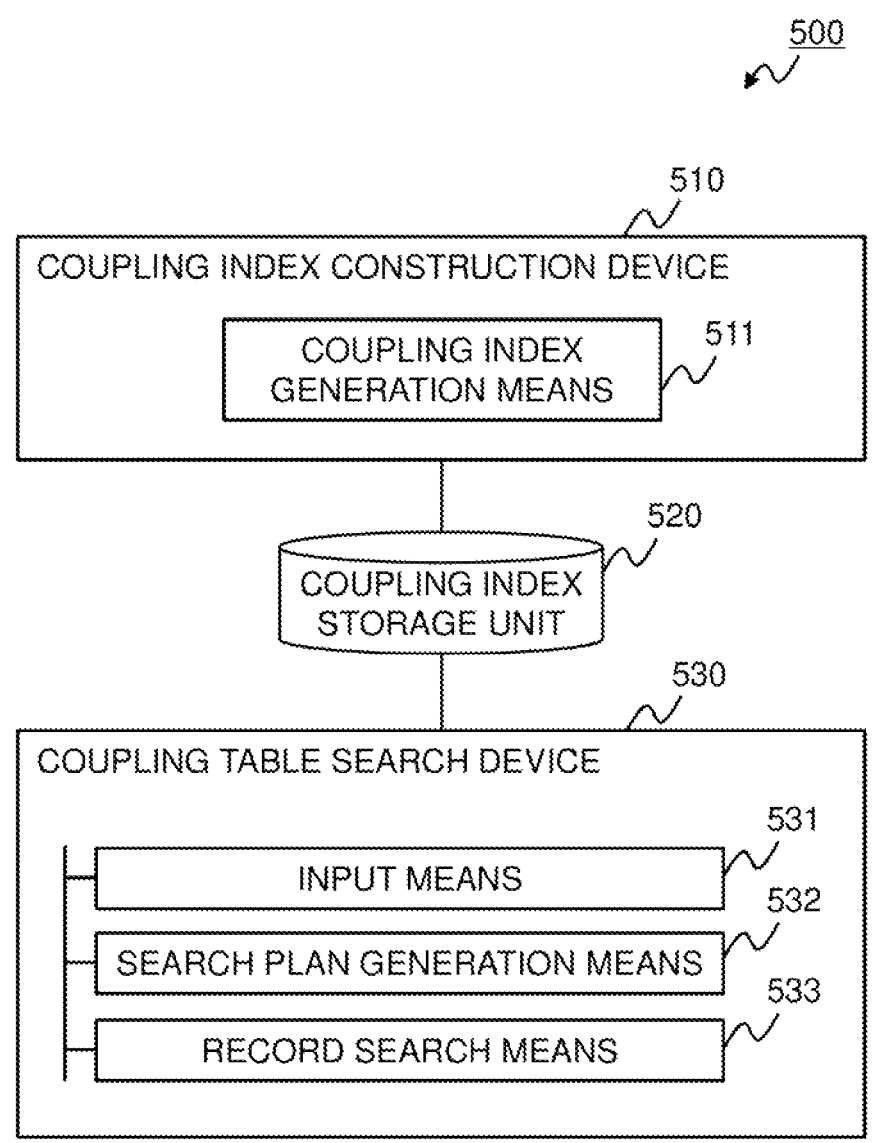
FIG. 17 It depicts a block diagram illustrating an outline of a coupling table specification system according to the present invention.

Next, an outline of the present invention will be described. FIG. 17 is a block diagram illustrating an outline of a coupling table specification system according to the present invention. A coupling table specification system 500 (for example, the coupling table specification system 100) of the present invention includes a coupling index construction device 510 (for example, the coupling index construction device 110) that constructs a coupling index that is an index for searching for a record of an external table of which a similarity calculated by a similarity function that is a function for calculating a similarity between records is greater than a predetermined threshold (for example, the threshold $T_r$), a coupling index storage unit 520 (for example, the coupling index storage unit 120) that stores the coupling index for each similarity function, and a coupling table search device 530 (for example, the coupling table search device 130) that searches for a table that is couplable to a target column among the external tables by using the coupling index.

The coupling index construction device 510 includes coupling index generation means 511 (for example, the coupling index generation unit 114) that generates the coupling index for each similarity function and stores the generated coupling index in the coupling index storage unit 520.

In addition, the coupling table search device 530 includes: input means 531 (for example, the input unit 132) that receives an input of the coupling index from the coupling index storage unit 520; search plan generation means 532 (for example, the search plan generation unit 134) that calculates, for each coupling index, the number of results that is the number of couplable record pairs estimated in a case where a record in the target column is found using the coupling index for each similarity function, and generates a search plan that defines a use order of the coupling index in descending order of the calculated number of results; and record search means 533 (for example, the record search unit 136) that searches for a record in the target column by using the coupling index in the order defined in the search plan, and specifies the external table in which records whose number is equal to or larger than a predetermined threshold (for example, the threshold TO have been found as a coupling table.

Then, the record search means 533 excludes a record in the external table that is found by an already used coupling index from the search target, and performs a search using a subsequent coupling index.

With such a configuration, it is possible to reduce a cost for specifying a table that is couplable to a target column.

In addition, the coupling index construction device 510 may include coupling column candidate extraction means (for example, the coupling column candidate extraction unit 112) that extracts, from each external table, a coupling column candidate that is a column including a record that can serve as a key of coupling to another table among external tables included in an external table group. Then, the coupling index generation means 511 may generate a coupling index of the extracted coupling column candidate for each similarity function, and store the generated coupling index in the coupling index storage unit 520. With such a configuration, a cost for generating the coupling index can be reduced.

In addition, the coupling column candidate extraction means may estimate each column type included in each external table, determine whether or not a column of the estimated type is couplable to a column of another table, and extract the coupling column candidate.

Specifically, in a case where the estimated column type indicates a predetermined meaning or is an attribute of a predetermined character, the coupling column candidate extraction means may extract the column as the coupling column candidate.

Figure 18:
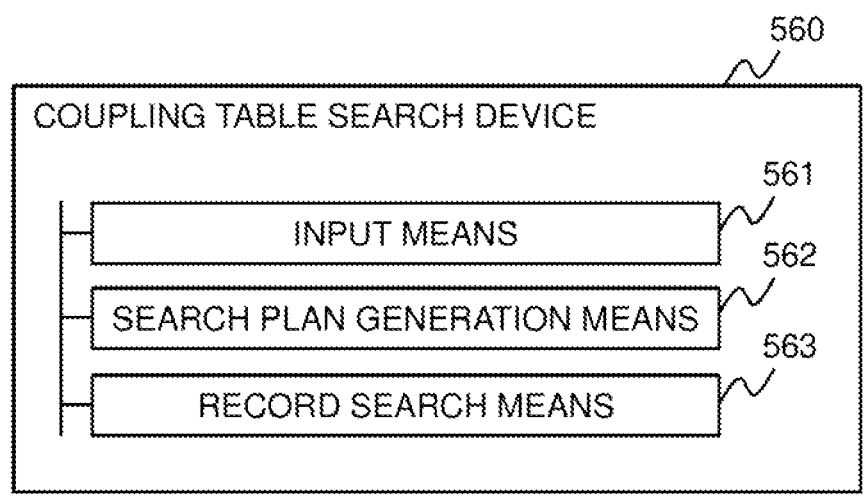
FIG. 18 It depicts a block diagram illustrating an outline of a coupling table search device according to the present invention.

FIG. 18 is a block diagram illustrating an outline of a coupling table search device according to the present invention. A coupling table search device 560 (for example, the coupling table search device 130) of the present invention includes: input means 561 (for example, the input unit 132) that receives, from a storage device (for example, the coupling index storage unit 120) that stores, for each similarity function, a coupling index that is an index for searching for a record of an external table of which a similarity calculated by a similarity function that is a function for calculating a similarity between records is greater than a predetermined threshold (for example, the threshold $T_r$), an input of the coupling index; search plan generation means 562 (for example, the search plan generation unit 134) that calculates, for each coupling index, the number of results that is the number of couplable record pairs estimated in a case where a record in the target column is found by using the coupling index for each similarity function, and generates a search plan that defines a use order of the coupling index in descending order of the calculated number of results; and record search means 563 (for example, the record search unit 136) that searches for the record in the target column by using the coupling index in the order defined in the search plan, and specifies the external table in which records whose number is equal to or larger than a predetermined threshold (for example, the threshold TO have been found as a coupling table.

The record search means 563 excludes a record in the external table that is found by an already used coupling index from the search target, and performs a search using a subsequent coupling index.

Even with such a configuration, it is possible to reduce a cost for specifying a table that is couplable to a target column.

Figure 19:
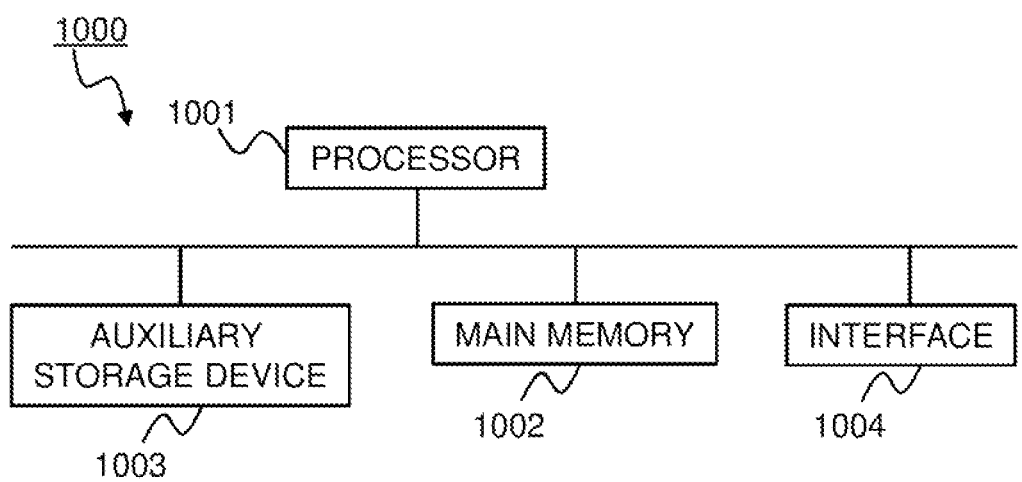
FIG. 19 It depicts a schematic block diagram illustrating a configuration of a computer according to at least one exemplary embodiment.

FIG. 19 is a schematic block diagram illustrating a configuration of a computer according to at least one exemplary embodiment. A computer 1000 includes a processor 1001, a main storage device 1002, an auxiliary storage device 1003, and an interface 1004.

The coupling table search device 560 described above is implemented in the computer 1000. Then, the operation of each processing unit described above is stored in the auxiliary storage device 1003 in the form of a program (coupling table search program). The processor 1001 reads the program from the auxiliary storage device 1003, develops the program in the main storage device 1002, and executes the above processing according to the program.

Note that, in at least one exemplary embodiment, the auxiliary storage device 1003 is an example of a non-transitory tangible medium. Other examples of the non-transitory tangible medium include a magnetic disk, a magneto-optical disk, a compact disc read-only memory (CD-ROM), a digital versatile disk (DVD)-ROM, a semiconductor memory, and the like connected via the interface 1004. Furthermore, in a case where the program is distributed to the computer 1000 via a communication line, the computer 1000 that has received the program may develop the program in the main storage device 1002 and execute the above processing.

Furthermore, the program may be for implementing some of the functions described above. In addition, the program may be a program that implements the above-described functions in combination with another program already stored in the auxiliary storage device 1003, a so-called difference file (difference program).

Some or all of the above exemplary embodiments may be described as the following supplementary notes, but are not limited to the following.

(Supplementary note 1) A coupling table specification system including:
  a coupling index construction device that constructs a coupling index that is an index for searching for a record of an external table of which a similarity calculated by a similarity function that is a function for calculating a similarity between records is greater than a predetermined threshold;

a coupling index storage unit that stores the coupling index for each similarity function; and a coupling table search device that searches for a table that is couplable to a target column among the external tables by using the coupling index, in which the coupling index construction device includes coupling index generation means that generates the coupling index for each similarity function and stores the generated coupling index in the coupling index storage unit, the coupling table search device includes:

input means that receives an input of the coupling index from the coupling index storage unit;

search plan generation means that calculates, for each coupling index, the number of results that is the number of couplable record pairs estimated in a case where a record in the target column is found by using the coupling index for each similarity function, and generates a search plan that defines a use order of the coupling index in descending order of the calculated number of results; and record search means that searches for the record in the target column by using the coupling index in the order defined in the search plan, and specifies the external table in which records whose number is equal to or larger than a predetermined threshold have been found as a coupling table, and the record search means excludes, from a search target, a record in the external table found using an already used coupling index, and performs a search using a subsequent coupling index.

(Supplementary note 2) The coupling table specification system according to Supplementary note 1, in which the coupling index construction device further includes coupling column candidate extraction means that extracts, from each external table, a coupling column candidate that is a column including a record that serves as a key of coupling to another table among the external tables included in an external table group, and the coupling index generation means generates a coupling index of the extracted coupling column candidate for each similarity function, and stores the generated coupling index in the coupling index storage unit.

(Supplementary note 3) The coupling table specification system according to Supplementary note 2, in which the coupling column candidate extraction means estimates each column type included in each external table, determines whether or not a column of the estimated type is couplable to a column of another table, and extracts the coupling column candidate.

(Supplementary note 4) The coupling table specification system according to Supplementary note 3, in which in a case where the estimated column type indicates a predetermined meaning or is an attribute of a predetermined character, the coupling column candidate extraction means extracts the column as the coupling column candidate.

(Supplementary note 5) A coupling table search device including:

input means that receives, from a storage device that stores, for each similarity function, a coupling index that is an index for searching for a record of an external table of which a similarity calculated by a similarity function that is a function for calculating a similarity between records is greater than a predetermined threshold, an input of the coupling index;

search plan generation means that calculates, for each coupling index, the number of results that is the number of couplable record pairs estimated in a case where a record in the target column is found by using the coupling index for each similarity function, and generates a search plan that defines a use order of the coupling index in descending order of the calculated number of results; and record search means that searches for the record in the target column by using the coupling index in the order defined in the search plan, and specifies the external table in which records whose number is equal to or larger than a predetermined threshold have been found as a coupling table, in which the record search means excludes, from a search target, a record in the external table found using an already used coupling index, and performs a search using a subsequent coupling index.

(Supplementary note 6) A coupling table specification method including:

generating a coupling index that is an index for searching for a record of an external table of which a similarity calculated by a similarity function that is a function for calculating a similarity between records is greater than a predetermined threshold, for each similarity function;

storing the generated coupling index in a coupling index storage unit;

receiving an input of the coupling index from the coupling index storage unit;

calculating, for each coupling index, the number of results that is the number of couplable record pairs estimated in a case where a record in the target column is found by using the coupling index for each similarity function;

generating a search plan that defines a use order of the coupling index in descending order of the calculated number of results; and searching for the record in the target column by using the coupling index in the order defined in the search plan, and specifying the external table in which records whose number is equal to or larger than a predetermined threshold have been found as a coupling table, in which in the searching for the record, a record in the external table found using an already used coupling index is excluded from a search target, and a search using a subsequent coupling index is performed.

(Supplementary note 7) The coupling table specification method according to Supplementary note 6, further including:

extracting, from each external table, a coupling column candidate that is a column including a record that serves as a key of coupling to another table among the external tables included in an external table group, and generating a coupling index of the extracted coupling column candidate for each similarity function, and storing the generated coupling index in the coupling index storage unit.

(Supplementary note 8) A coupling table search method including:

receiving, from a storage device that stores, for each similarity function, a coupling index that is an index for searching for a record of an external table of which a similarity calculated by a similarity function that is a function for calculating a similarity between records is greater than a predetermined threshold, an input of the coupling index;

calculating, for each coupling index, the number of results that is the number of couplable record pairs estimated in a case where a record in the target column is found by using the coupling index for each similarity function;

generating a search plan that defines a use order of the coupling index in descending order of the calculated number of results; and searching for the record in the target column by using the coupling index in the order defined in the search plan, and specifying the external table in which records whose number is equal to or larger than a predetermined threshold have been found as a coupling table, in which in the searching for the record, a record in the external table found using an already used coupling index is excluded from a search target, and a search using a subsequent coupling index is performed.

(Supplementary note 9) A program storage medium storing a coupling table search program for causing a computer to execute:

input processing of receiving, from a storage device that stores, for each similarity function, a coupling index that is an index for searching for a record of an external table of which a similarity calculated by a similarity function that is a function for calculating a similarity between records is greater than a predetermined threshold, an input of the coupling index;

search plan generation processing of calculating, for each coupling index, the number of results that is the number of couplable record pairs estimated in a case where a record in the target column is found by using the coupling index for each similarity function, and generating a search plan that defines a use order of the coupling index in descending order of the calculated number of results; and record search processing of searching for the record in the target column by using the coupling index in the order defined in the search plan, and specifying the external table in which records whose number is equal to or larger than a predetermined threshold have been found as a coupling table, in which in the record search processing, a record in the external table found using an already used coupling index is excluded from a search target, and a search using a subsequent coupling index is performed.

(Supplementary note 10) A coupling table search program for causing a computer to execute:

input processing of receiving, from a storage device that stores, for each similarity function, a coupling index that is an index for searching for a record of an external table of which a similarity calculated by a similarity function that is a function for calculating a similarity between records is greater than a predetermined threshold, an input of the coupling index;

search plan generation processing of calculating, for each coupling index, the number of results that is the number of couplable record pairs estimated in a case where a record in the target column is found by using the coupling index for each similarity function, and generating a search plan that defines a use order of the coupling index in descending order of the calculated number of results; and record search processing of searching for the record in the target column by using the coupling index in the order defined in the search plan, and specifying the external table in which records whose number is equal to or larger than a predetermined threshold have been found as a coupling table, in which in the record search processing, a record in the external table found using an already used coupling index is excluded from a search target, and a search using a subsequent coupling index is performed.

Although the present invention has been described above with reference to the exemplary embodiments, the present invention is not limited to the above exemplary embodiments. Various modifications that can be understood by those skilled in the art can be made to the configuration and details of the present invention within the scope of the present invention.

REFERENCE SIGNS LIST

10 External table storage device
20 Table storage device
21 Coupling table storage unit
22 Correlation table storage unit
100 Coupling table specification system
110 Coupling index construction device
112 Coupling column candidate extraction unit
114 Coupling index generation unit
120 Coupling index storage unit
130 Coupling table search device
132 Input unit
134 Search plan generation unit
136 Record search unit
138 Coupling table output unit
140 Coupling table storage unit
200 Correlation table specification system
210 Correlation index construction device
212 Non-coupling column candidate extraction unit
214 Correlation index generation unit
220 Correlation index storage unit
230 Correlation table search device
232 Input unit
234 Index specification unit
236 Candidate column search unit
238 Correlation table output unit
240 Correlation table storage unit
300 Table integration system
310 Integrated table generation device
312 Input unit
314 Table coupling unit
316 Feature processing unit
318 Feature selection unit
320 Integrated table output unit
330 Integrated table storage unit
400 External data utilization system

What is claimed is:

1. A coupling table specification system comprising:
a memory storing instructions; and
one or more processors configured to execute the instructions to perform processing comprising:
receiving a target column;
generating a search plan defining a use order of each of indexes based on a number of records in external tables to be joined with a target column, the number calculated by using each of the indexes; and
searching, in the use order defined in the search plan, one or more tables to be coupled with the target column in the external tables, wherein each of the indexes defines records in the external tables, the records being selected based on similarity functions calculating a score between the records, and the processing further comprises:

extracting from each external table, a coupling column candidate that is a column including a record serving as a key of coupling to another table among the external tables included in an external table group; and generating a coupling index of the extracted coupling column candidate for each similarity function, and storing the generated coupling index in a coupling index storage.

2. The coupling table specification system according to claim 1, wherein the processing further comprises:

estimating each of at least one column type included in each external table; and determining whether or not a column of each estimated column type is couplable to a column of another table.

3. The coupling table specification system according to claim 2, wherein the processing comprises, for each estimated column type, in a case where the each estimated column type indicates a predetermined meaning or is an attribute of a predetermined character, extracting the column of the each estimated column type as the coupling column candidate.

4. The coupling table specification system according to claim 1, wherein the processing comprises constructing each index for searching for a record of an external table of which the score calculated by the similarity functions is greater than a predetermined threshold.

5. A coupling table specification method performed by a computer and comprising:

receiving a target column;

generating a search plan defining a use order of each of indexes based on a number of records in external tables to be joined with a target column, the number calculated by using each of the indexes; and searching, in the use order defined in the search plan, one or more tables to be coupled with the target column in the external tables, wherein each of the indexes defines records in the external tables, the records being selected based on similarity functions calculating a score between the records, and the coupling table specification method further comprises:

extracting from each external table, a coupling column candidate that is a column including a record serving as a key of coupling to another table among the external tables included in an external table group; and generating a coupling index of the extracted coupling column candidate for each similarity function, and storing the generated coupling index in a coupling index storage.

6. A non-transitory computer readable information recording medium storing a coupling table search program executable by a processor to perform a method comprising:

receiving a target column;

generating a search plan defining a use order of each of indexes based on a number of records in external tables to be joined with a target column, the number calculated by using each of the indexes; and searching, in the use order defined in the search plan, one or more tables to be coupled with the target column in the external tables, wherein each of the indexes defines records in the external tables, the records being selected based on similarity functions calculating a score between the records, and the method further comprises:

extracting from each external table, a coupling column candidate that is a column including a record serving as a key of coupling to another table among the external tables included in an external table group; and generating a coupling index of the extracted coupling column candidate for each similarity function, and storing the generated coupling index in a coupling index storage.

* * * * *